United States Patent
Merkel et al.

(10) Patent No.: US 10,124,684 B2
(45) Date of Patent: Nov. 13, 2018

(54) METHOD AND ARRANGEMENT FOR WIRELESS ENERGY TRANSFER

(71) Applicants: Harald Merkel, Lindome (SE); Anders Karlstrom, Gothenburg (SE)

(72) Inventors: Harald Merkel, Lindome (SE); Anders Karlstrom, Gothenburg (SE)

( * ) Notice: Subject to any disclaimer, the term of this patent is extended or adjusted under 35 U.S.C. 154(b) by 210 days.

(21) Appl. No.: 15/031,348

(22) PCT Filed: Oct. 24, 2014

(86) PCT No.: PCT/SE2014/051257
§ 371 (c)(1),
(2) Date: Apr. 22, 2016

(87) PCT Pub. No.: WO2015/060781
PCT Pub. Date: Apr. 30, 2015

(65) Prior Publication Data
US 2016/0243949 A1    Aug. 25, 2016

(30) Foreign Application Priority Data
Oct. 24, 2013    (SE) ..................... 1351262

(51) Int. Cl.
| | |
|---|---|
| *B60L 11/18* | (2006.01) |
| *H02J 50/40* | (2016.01) |
| *H04B 5/00* | (2006.01) |
| *H02J 7/02* | (2016.01) |

(Continued)

(52) U.S. Cl.
CPC ......... *B60L 11/182* (2013.01); *B60L 11/1829* (2013.01); *H02J 7/025* (2013.01); *H02J 50/12* (2016.02); *H02J 50/40* (2016.02); *H02J 50/90* (2016.02); *H04B 5/0037* (2013.01); *H04B 5/0087* (2013.01)

(58) Field of Classification Search
CPC .............................. H02J 50/90; H04B 5/0087
See application file for complete search history.

(56) References Cited

U.S. PATENT DOCUMENTS

| | | |
|---|---|---|
| 1,119,732 A | 12/1914 | Tesla |
| 2,783,384 A | 2/1957 | Bright et al. |
| 4,685,150 A | 8/1987 | Maier |

(Continued)

FOREIGN PATENT DOCUMENTS

| | | |
|---|---|---|
| EP | 0119561 A2 | 9/1984 |
| EP | 2417686 A1 | 2/2012 |

(Continued)

OTHER PUBLICATIONS

Parise,"wireless power transmission in public transportation," Jan. 6, 2009, pp. 1-9.*

(Continued)

*Primary Examiner* — Thienvu Tran
*Assistant Examiner* — Pinping Sun
(74) *Attorney, Agent, or Firm* — Young & Thompson

(57) ABSTRACT

An arrangement, system and method are described which enhance efficiency, reduce the stray field of wireless power transfer, and make use of special coil geometries for transmitter and receiver. The coil geometry is an approximation of a multipole current. Such currents have a faster decaying electromagnetic field compared to traditional coils. This allows higher power densities to be transferred.

18 Claims, 22 Drawing Sheets

(51) Int. Cl.
*H02J 50/12* (2016.01)
*H02J 50/90* (2016.01)

(56) References Cited

U.S. PATENT DOCUMENTS

| | | | | |
|---|---|---|---|---|
| 4,942,352 | A * | 7/1990 | Sano | H01F 38/14 |
| | | | | 320/134 |
| 7,825,543 | B2 | 11/2010 | Karalis et al. | |
| 7,872,562 | B2 * | 1/2011 | Meinke | G21K 1/093 |
| | | | | 336/225 |
| 2007/0145830 | A1 * | 6/2007 | Lee | H02J 5/005 |
| | | | | 307/135 |
| 2008/0261534 | A1 * | 10/2008 | Wang | H04W 52/04 |
| | | | | 455/67.11 |
| 2010/0033021 | A1 * | 2/2010 | Bennett | H02J 17/00 |
| | | | | 307/104 |
| 2010/0259217 | A1 * | 10/2010 | Baarman | H02J 5/005 |
| | | | | 320/108 |
| 2011/0140653 | A1 * | 6/2011 | Jung | H02J 50/12 |
| | | | | 320/108 |
| 2011/0163542 | A1 | 7/2011 | Farkas | |
| 2012/0139358 | A1 * | 6/2012 | Teggatz | H01F 38/14 |
| | | | | 307/104 |
| 2012/0235636 | A1 * | 9/2012 | Partovi | H02J 7/025 |
| | | | | 320/108 |
| 2012/0286584 | A1 | 11/2012 | Park et al. | |
| 2012/0299389 | A1 | 11/2012 | Lee | |
| 2013/0002510 | A1 | 1/2013 | Azulay et al. | |
| 2013/0119929 | A1 | 5/2013 | Partovi | |
| 2013/0249303 | A1 * | 9/2013 | Keeling | H01F 27/022 |
| | | | | 307/104 |
| 2014/0028111 | A1 * | 1/2014 | Hansen | H01F 38/14 |
| | | | | 307/104 |
| 2014/0111019 | A1 * | 4/2014 | Roy | G01V 3/081 |
| | | | | 307/104 |

FOREIGN PATENT DOCUMENTS

WO 2010/118191 A1 10/2010
WO 2013/142720 A1 9/2013

OTHER PUBLICATIONS

Fedotov,"Resonant transparency and Non-trivial non-radiating excitation in toroidal metamaterials," Aug. 23, 2013,scientific reports,pp. 1-5.*
International Search Report issued in Application Serial No. PCT/SE2014/051257, dated Dec. 19, 2014.

* cited by examiner

METHOD AND ARRANGEMENT FOR WIRELESS ENERGY TRANSFER

TECHNICAL FIELD

The present disclosure relates to wireless energy transfer in general, and particularly to improved methods and arrangements supporting such wireless energy transfer.

BACKGROUND

Wireless power transfer is based on resonant coil structures located close to each other. In order to enhance efficiency we have to control the region where the field is large. In order to reduce stray field we have to control the regions where the field are small. The apparatus of wireless power transfer described here is small compared to a wavelength of the resonance oscillation used. This invention proposes a setup to use multipole coil structures. With these multipoles, a non-radiating current is approximated. By this, the stray field is reduced and the power is focused to a region small compared to traditional coils. Multipole coils are obtained by configuring the windings and the current in a coil array to approximate a spatial differentiation or predetermined direction and order. These multipole coils are used as part of the transmitter or receiver coil structures. The enhanced directivity of these coil structures allows to improve positioning of the receiver with respect to the transmitter.

SUMMARY

It is an object of the proposed technology to provide methods and arrangements for improved wireless energy transfer.

The improvement is found in using superposition of multipole coils instead of traditional coils. By this superposition, we approximate a non-radiating current.

This allows the reactive near field of the source to be designed in power density and spatial structure according to design goals In a first aspect, there is provided a means to reduce stray field when transferring power wirelessly.

In a second aspect, there is provided a means to enhance the efficiency by reducing the volume where the field is concentrated. Absorbing material outside this volume does not act as a power loss.

In a third aspect, there is provided a means to electronically control the position of the field in space thus allowing compensation for variations in position, in turning angle of the unit receiving the wirelessly sent power.

In a fourth aspect, there is provided a related means to electronically control the position of the field in space thus allowing compensation for motion of the unit receiving the wirelessly sent power.

In a fifth aspect there, is provided a means to reduce the far field of the coil structure.

This and other objects are met by embodiments of the proposed technology.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Figure 1:
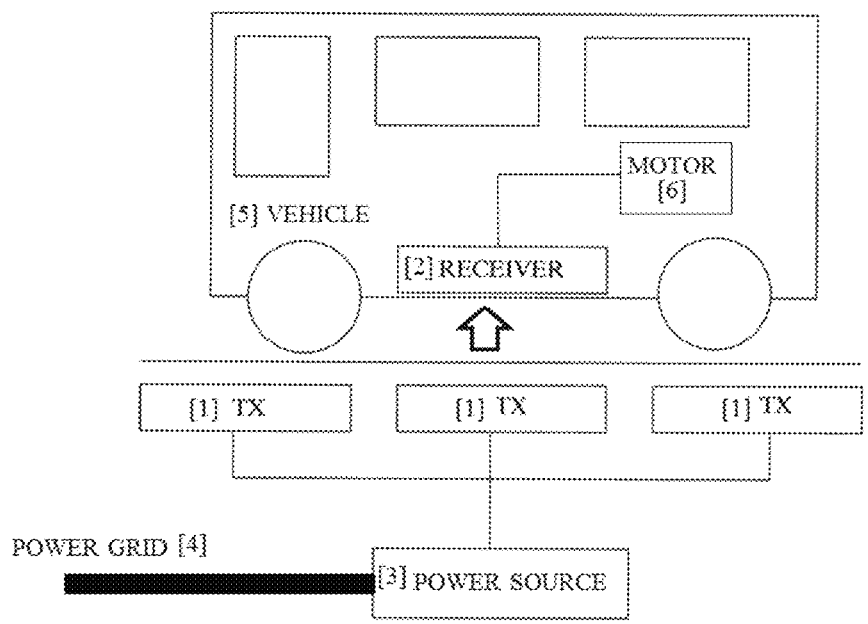
FIG. 1 is a schematic block diagram of a power transfer system.

For a better understanding of the proposed technology, it may be useful to begin with a brief overview of prior art.

With increased interest in electrical vehicles, the need for simplified solutions concerning re-charging of batteries in such vehicles has multiplied. One common solution entails attaching a cable to the vehicle when it is parked in a designated area. Plugging in or removing a cable in heavy rain is not very convenient. Contact corrosion and dirt reduces cable lifetime. Thus, wireless charging of vehicles emerges as an interesting alternative.

Introduction of electrically powered vehicles on a large scale, in particular in the field of public transportation, is hampered by the fact that the charging of the batteries requires the vehicle to be parked and connected to a charging station. Due to the limited mileage available even of a full battery a bus would spend considerable time standing still while charging, thus limiting the commercial use. A recent area of technology striving to overcome this is the field of wireless power transfer. Basically, no wire is needed for charging the vehicle. The only requirement is that the vehicle is parked in a designated charging area to enable the wireless power transfer. As an outlook, charging of moving vehicles is a need which will come up.

Charging of sensors placed in non-accessible areas such as moisture sensors behind tiles in bathrooms and temperature sensors in rotating equipment in paper and pulp industry are further areas of application for wireless power transfer.

Wireless charging is based on the application of weakly coupled transformers. In literature, these are referred to as Tesla-, leakage field-, stray field- or air transformers. All these approaches have in common that a suitable primary transmission (abbreviated "TX") coil unit (denoted 1 in FIGS. 1 and 2) is attached to a high frequency power source 3 to generate a magnetic field from a power grid 4. Then a secondary coil unit—the receiver (abbreviated "RX") denoted by 2 in FIG. 1—is placed in the field and is mounted on a vehicle 5. This receiver 2 collects the power and contains a suitable voltage adjustment unit and rectifier to drive an application 6. This is shown as a block schematic in FIG. 1.

Principle of Wireless Power Transfer

Resonant Energy Transfer has first been described by Nikola Tesla in 1902 [1]. There, two spatially separated resonant circuits are described, a first being coupled to a power generator acting as transmitter and a second acting as a receiver where a load is attached to. As soon as these resonant circuits are placed close enough to each other, their resonances couple and form a single resonance. Tuning the power generator to the common resonance frequency, a strong oscillation is excited in both resonant circuits where a considerable fraction of the generator power can be extracted from the receiver circuit. This is the physical principle this invention is founded on.

Power Generation

A most suitable and efficient way to construct a power generator that is able to tune in on a resonance is found in the topology of Royer oscillators [2]. Besides a very low part count, the usage of a coil with center tap provides excellent symmetry and robustness of the circuit.

Nevertheless, for larger power applications, the accuracy of the frequency extraction and the quality of the control signals for the power transistors are not sufficient so a digital frequency generation scheme must be applied. This follows essentially the methods described by Maier [3] for FM radios. There a probe yields the peak voltage of an oscillation and its frequency being extracted from a resonant circuit and fed to a microcontroller. The microcontroller generates then a voltage, which is input to a voltage controlled oscillator (VCO) unit. The VCO output signal is used in a power amplifier that in its turn powers the resonant circuits. At the resonant circuit the aforementioned probe is attached. The method described there is used here to generate the required power signals.

Lenses, Coils, Diaphragms

A typical State of the Art configuration for wireless, resonant power transfer is described by Ji Myung Kang [4] or Fisher [5]. All devices being involved in the resonances are simple coils. A repeatedly occurring problem is how to concentrate a generated resonance field (being electric or magnetic of nature) to increase efficiency of the coupling and/or to reduce stray fields. The generated fields are optimized by either ferrites or lenses. The usage of lenses is to be questioned since all considered apertures are much smaller than a wavelength and the focusing action of lenses require a physical dimension to be at least larger than some wavelengths. Similar considerations arise when diaphragms are used—the fields passing through a small aperture will be spherical waves as described by Airy [6]. A field concentration beyond the limits given by said source cannot be achieved using diaphragms. This is also valid for near field approaches.

At certain points in the State of the Art Arrays of coils are described. Their sole purpose is to solve the positioning problem when a receiver is mounted on a vehicle and power flow needs optimization [7]. Generally, all these coils are either activated or inactive and a single current source is switched between them.

One general problem when utilizing wireless energy transfer is how to ensure efficient energy transfer and at the same time to minimize the risk of accidental exposure to far field components. This is particularly important when developing wireless energy transfer, which is not limited to a designated charging place, but instead takes place during active use of the vehicle in motion.

Non Radiating Currents

Even the concept of non-radiating currents is not novel as such. Such current distributions have been described by Devaney and Wolff [8] as a means to formulate the ill-posedness of an inverse scattering process. Knowing the currents, one can uniquely calculate the fields generated by them. Knowing the field, one cannot uniquely determine the structure and distribution of the currents generating them. It implies that one can add arbitrary amounts of current distributions of special forms without changing the fields outside a predetermined volume. Being a merely theoretical concept available to the scientific community for 40 years, it has just recently found a first application in a novel antenna design described by Azulay [9].

Review of Non Radiating Currents

The subsequent Review is based on Devaney and Wolf's initial paper [8] adopted in notation to today's use in Engineering.

Non radiating currents are initially defined as follows:

Starting with the relation for the magnetic potential $\vec{A}$ we have with k as wave vector $k=\varepsilon\mu\sqrt{\omega}$, $\vec{j}$ as the electric excitation current density. $\varepsilon$ denotes the dielectric constant, $\mu$ the permeability and $\omega$ the angular frequency of the current and fields.

$$\Delta\vec{A} - k^2\vec{A} = \mu\vec{j} \qquad \text{(Eqn. 1)}$$

Then the electric $\vec{E}$ and magnetic $\vec{H}$ fields are calculated as:

$$\vec{H} \mu/1 \nabla \times \vec{A}, \qquad \text{(Eqn. 2)}$$

$$\vec{E} = j\omega \nabla \times \nabla \times \vec{A} \qquad \text{(Eqn. 3)}$$

Assume now, any volume current distribution to be composed of two parts $\vec{J}=\vec{J}_r+\vec{J}_n$ where $\vec{J}_n$ fulfills the Helmholtz-type equation (Eqn. 4).

$$\Delta \vec{J}_n - (k^2-\mu)\vec{J}_n = 0 \quad \text{(Eqn. 4)}$$

It is further assumed that $\vec{J}_n$ as well as $\vec{J}_r$ and $\vec{J}$ vanish outside a given source volume. $\vec{J}_r$ is the residual current that adds up to any given current distribution $\vec{J}$. Inserting the above current decomposition and replacing $\mu\vec{J}_n$ from the above expression for the current in our field Helmholtz equation we find:

$$\Delta(\vec{A}-\mu\vec{J}_n) - k^2(\vec{A}-\mu\vec{J}_n) = \mu\vec{J}_r \quad \text{(Eqn. 5)}$$

We may introduce an abbreviation $\tilde{\vec{A}}=(\vec{A}-\mu\vec{J}_n)$ which is a solution of the radiating current's fields. Since $\tilde{\vec{A}}=(\vec{A}-\mu\vec{J}_n)=\vec{A}$ wherever $\vec{J}_n=0$ is valid, we conclude that $\vec{J}_n$ does not radiate outside the source volume.

Summarizing, we may conclude, that ANY current that takes the form of a solution of a Helmholtz-Equation of the form (Eqn. 4) at a given frequency WILL NOT create fields outside the source region at said frequency.

Thus, we refer to it as a non-radiating current.

Multipoles

All solutions found in literature and presented in the State of the Art are monopole coils. In this invention, higher order coils are presented and used for a set or purposes claimed there. Nevertheless, the concept of multipoles and multipole sources as such is not novel:

The usage of higher order derived sources—i.e. multipoles—to solve various otherwise intractable field problems analytically has been shown by Lindell [10]. He solves the Sommerfeld problem—an electrical monopole source in air located above a dielectric halfspace—using imaging and source decomposition. For this purpose, the image source consists of a superposition of monopoles and higher order sources to account for the phase delay occurring in the dielectric. In this framework, he states the equivalence of multipole series expansion and power series expansion of a source current. This implies that any current distribution on a surface can be approximated to arbitrary accuracy by a superposition of multipoles collocated on a point on or close this surface.

Lindell [11] also states the interchangeability of differential and integral operators and demonstrates the usage of this relation to find the field expressions of multipole sources. Hereby we note that the differential character of the source current in a multipole is inherited to the decay of the resulting fields effectively leading to a more and more pronounced concentration of the fields close to the source with increasing order of the multipole.

Multipole coils have been described by VanVeldhoven [12] as a means to correct imaging errors in cathode ray tubes. Here the multipole coil is described as a means to generate multipole magnetic fields.

Nevertheless, we have to point out that these electrodynamic multipole sources still possess a far field. This far field can be proven to decay with an exponent in the distance to the source of 1. The decay rate is not reduced for higher multipoles. This can shown using repeated chain rules on the Green's function [13].

Throughout the drawings, the same reference numbers are used for similar or corresponding elements.

For a better understanding of the proposed technology, it may be useful to begin with an overview of the general properties of multipole coils.

In this disclosure, we deal with very low frequency processes and with circuit elements very small compared to a wavelength. Therefore, it is suitable to study the case for static situations only. In this context one also have to point out that the limiting case of these electrodynamic multipoles does only yield correct relations in coincidence with Biot-Savart law when proper gauge normalizations are carried out. The magnetostatic approach (with constant currents) within a Lorentz gauge implies infinitely large charges to pile up causing singularities in the Green's function and is therefore not physically meaningful. The magnetostatic approach has to make use of a divergence free potential formulation.

The proposed technology discloses a method and an arrangement for enabling improved inductive wireless power transfer to vehicles. The arrangement comprises a so called Tesla transformer which is configured to have a current distribution that does not have any far field e.g. a non-radiating current. Power is transferred wirelessly from a power supply to a vehicle by means of inductively coupled resonant multipole loops or coils.

Consequently, the proposed technology includes at least one Tesla transformer comprising a transmitting array of coils e.g. a multipole loop, which is installed in or near the road surface at positions where vehicles stop for a shorter or longer period of time. Typical locations are bus-stops, intersections, parking lots, traffic lights etc. A corresponding receiving array of coils or receiving multipole loop is arranged beneath a vehicle such as a bus. When the receiving array in the vehicle is in the vicinity of the transmitting array, the transmitting and receiving coils are inductively coupled and a current is induced in the vehicle. Since buses in particular do not always stop at the exact same spot, it is beneficial to arrange a series of transmitting arrays along a bus stop. Thereby, the receiving coil in the bus will always end up near at least one of the transmitting arrays along the bus stop. The same methodology can be used at e.g. traffic lights or intersections, where multiple transmitting arrays can be arranged within a predetermined distance from the traffic light or intersection, whereby not only the first vehicle in a line is charged, but also at least the subsequent car as well. At the same time it is not critical that the car stops right on top of a predetermined location. Similar arrangements can be made placing the transmitter overhead on a gantry and placing the receiver on top of the roof of the vehicles.

Further, the current of the transmitting array of coils (and receiving array) is controlled to generate a current distribution which approximates a non-radiating current e.g. a minimally radiating magnetic field during power transfer. (This is further discussed in one of the attachments). Basically the current distribution is controlled by means of choosing the distribution of the windings of the respective coils of the transmitting and receiving arrays. This prevents the risk of the transmitting array affecting anything other than the actual coils of the receiving vehicle during power transfer. In other words, the currents of the transmitting array is controlled to reduce (ideally eliminate) the stray field of the Tesla transformer. Also, the transmitted power can be focused even for coil sizes that are smaller than a wavelength (at 30 kHz the wavelength is 1 km).

By enabling a non-radiating current, the potential accidental interaction between the transmitting coils and the surroundings during power transfer is minimized.

The array of coils (as well as the vehicular coil) is preferably manufactured by printing on circuit boards.

In order to reduce stray field in charger application, we wish to confine the currents to an as small area as possible. In cases of larger charger plates, we wish to configure the field in a way to couple the field in an optimum way to certain locations and try to null out other locations. Other applications for wireless power transfer require a homogenous field distribution across an area. For larger power transfers, air discharges must be avoided and therefore the fields must not exceed certain limits. In the future, charging may take place when the charged object is moving. Shortly summarizing, we have to develop tools to engineer the fields after our wishes.

How can we manipulate the fields generated?

Traditionally, engineers tend to arrange the current elements in coils or along other wire based objects. Optimizing coil or loop geometry and positions are then used to achieve certain design goals. For this purpose, the fields for a given source geometry are calculated and the source geometry modified until the goals are reached. Usually a local minimum is found.

At the end, we have to convert our findings to physically realizable wire based objects as well but the approach how to get there is different and the outcome will not necessarily be traditional coils and loops but irregularly formed wire structures. In addition, we can tell if the obtained design is in a local or global minimum.

Let us investigate the magnetic flux density created by a current element:

Typical excitation frequencies for wireless charging systems are around 100 kHz and do not exceed 1 MHz. This implies wavelengths ranging from 300 m to 3 km. Thus, the transmitter and receiver can be assumed to be much smaller than a wavelength. As a consequence, we can disregard any effects from wave propagation in these applications. Therefore the analysis of a wireless charging systems can be done in a static approximation. Within an electrodynamic framework one would consider this analysis to deal with the reactive near field of a source.

In the magnetostatic case (i.e. currents are assumed to be constant and there are no effects of retarded potentials are present within the region of interest, no far fields etc.) the magnetic flux density is expressed using Biot-Savart's law:

$$d\vec{B} = \frac{\mu_0}{4\pi} \frac{d\vec{J} \times (\vec{x} - \vec{x_0})}{\|\vec{x} - \vec{x_0}\|^3}$$ (Eqn. 6)

Here $d\vec{B}$ denotes the additional flux density at the observation point $\vec{x}$ caused by a current element $d\vec{J}$ being located at the source point $\vec{x_0}$. In order to obtain the total field of a current distribution, one has to integrate over all currents present.

$$\vec{B} = \frac{\mu_0}{4\pi} \int \frac{d\vec{J} \times (\vec{x} - \vec{x_0})}{\|\vec{x} - \vec{x_0}\|^3}$$ (Eqn. 7)

The fields of a current element decay as we increase the distance to the source. Very far away from the source, we can approximate the field to be proportional to the following expression where n denotes a positive integer number known as leading exponent.

$$d\vec{B} \propto \frac{1}{\|\vec{x}\|^n}$$ (Eqn. 8)

This leading exponent is found by evaluating the following limit for all possible directions of travel $\vec{x}$. The largest n that still yields a converging limit for all directions is the leading exponent.

$$\lim_{\vec{x} \to \infty} \|\vec{x}\|^n d\vec{B} = \frac{\mu_0}{4\pi} \lim_{\vec{x} \to \infty} \|\vec{x}\|^n \frac{d\vec{J} \times (\vec{x} - \vec{x_0})}{\|\vec{x} - \vec{x_0}\|^3}$$ (Eqn. 9)

There are two cases that must be treated separately. Currents parallel to the direction of derivation lead to other results than cases where the directions of derivatives orthogonal to the current.

Without loss of generality, we assume here the current element to be directed in z-direction.

For the magnetic flux density of a non-derived current element, we obtain:

$$\vec{B_0} = \left\{ -\frac{j_z y}{x^2 + y^2 + z^2}, \frac{j_z x}{x^2 + y^2 + z^2}, 0 \right\}$$ (Eqn. 10)

To obtain the leading exponent we have to evaluate the following set of limits for integer n≥1 and for any direction $\vec{q}$.

$$\lim_{\vec{x} \to \infty} \|\vec{x}\|^n d\vec{B} = \lim_{\sigma \to \infty} \|\sigma\vec{q}\|^n \overrightarrow{dB(\sigma\vec{q})}$$ (Eqn. 11)

With these limits at hand we have to find the least n that yields a nonzero finite value for this limit for any possible direction. Here we find that evaluating this limit parallel to the current and orthogonal to the current will yield two cases that must be distinguished. Thus, we have to evaluate:

$$\lim_{z \to \infty} -\frac{j_z y}{x^2 + y^2 + z^2} \cdot z^n$$ (Eqn. 12A)

$$\lim_{y \to \infty} -\frac{j_z y}{x^2 + y^2 + z^2} \cdot y^n$$ (Eqn. 12B)

By inspection of Eqns. 12 one finds that the least n before the limit diverges is n=1 (in Eqn 12B, Eqn 12A allows already n=2)

We denote that the field of a simple current element decays with a leading exponent of 1.

In order to manipulate the fields generated by a source, we consider the fields in a set of regions characterized by the distance to the source. In the simplest case, we set a suitable threshold on the distance to the source. We consider then the fields within and outside this sphere separately.

Assume we had access to a field source with a higher leading exponent e.g. 2, the higher exponent source will mostly act on the fields within the threshold and be negligible on the fields outside the threshold radius. We fulfill our design goals on the outer field by optimizing the sources with leading exponent 1. With these fields known in the interior of our threshold we set up a differential design goal for the sources with exponent 2. Then we design the strength and placement of the higher exponential sources and fulfill the differential design goal (at least in a Galerkin sense).

Indeed, there is a way to create field sources with any arbitrary leading exponent larger or equal than 1:

First we place two sources with 180 degrees phase difference in current close to each other normal to a certain direction $\vec{d}$. This leads to a difference representation of two sources. Then we have the spatial difference between the sources shrunk. This process yields a differential formulation that—in the limit of zero distance—turns into a Fréchet derivative of the current distribution [14]:

$$d\vec{B_1} = \qquad \text{(Eqn. 13)}$$

$$\frac{\mu_0}{4\pi} \lim_{\delta \to 0} \frac{1}{\delta} \left[ \frac{d\vec{J} \times \left(\vec{x} - \vec{x_0} - \frac{\delta}{2}\vec{d}\right)}{\left\|\vec{x} - \vec{x_0} - \frac{\delta}{2}\vec{d}\right\|^3} - \frac{d\vec{J} \times \left(\vec{x} - \vec{x_0} \mp \frac{\delta}{2}\vec{d}\right)}{\left\|\vec{x} - \vec{x_0} + \frac{\delta}{2}\vec{d}\right\|^3} \right] =$$

$$\frac{\mu_0}{4\pi} \frac{\frac{\partial}{\partial \vec{d}} d\vec{J} \times (\vec{x} - \vec{x_0})}{\left\|\vec{x} - \vec{x_0}\right\|^3}$$

Assume the sources to be put in free space, the radiation condition at infinity allows to rewrite the above relation in the form:

$$d\vec{B_1} = \frac{\mu_0}{4\pi} \frac{\frac{\partial}{\partial \vec{d}} d\vec{J} \times (\vec{x} - \vec{x_0})}{\left\|\vec{x} - \vec{x_0}\right\|^3} = \frac{\mu_0}{4\pi} \left[ d\vec{J} \times \frac{\partial}{\partial \vec{d}} \frac{(\vec{x} - \vec{x_0})}{\left\|\vec{x} - \vec{x_0}\right\|^3} \right] \qquad \text{(Eqn. 14)}$$

Thus, the field of a spatially derived current is equivalent to the spatially derived field of a non derived current.

This mechanism is also feasible for RF currents in geometries where the radiation condition provides the necessary convergence to be able to transfer the derivative from the current to the field using a partial integration procedure.

In the following, we have to investigate the leading exponent of a derived source: For the leading order calculation of the magnetic flux density of a first order derived current element, we have to evaluate two cases. The first case is obtained for a current derived with respect to z and the second for a current derived with respect to x:

$$d\vec{B_{1,z}} = \left\{ \frac{2j_z yz \operatorname{sgn}(x)}{(x^2 + y^2 + z^2)^2}, -\frac{2j_z xz \operatorname{sgn}(x)}{(x^2 + y^2 + z^2)^2}, 0 \right\} \qquad \text{(Eqn. 15A)}$$

$$d\vec{B_{1,x}} = \left\{ \frac{2j_z xy \operatorname{sgn}(x)}{(x^2 + y^2 + z^2)^2}, \frac{j_z}{x^2 + y^2 + z^2} - \frac{2j_z x^2 \operatorname{sgn}(x)}{(x^2 + y^2 + z^2)^2}, 0 \right\} \qquad \text{(Eqn. 15B)}$$

Evaluating the above limits Eqns. 15A and B for the leading exponents one finds the most critical situation to occur in Eqn. 15B for limits in x and z. One is left with n=2 (Eqn. 15A allows n=3).

A source of this type has thus a leading exponent of 2.

Generalizing the above finding, we can always create any leading exponent N with a source of the following type:

$$d\vec{B_N} = \frac{\mu_0}{4\pi} \frac{\frac{\partial^N}{\partial \vec{d}^N} d\vec{J} \times (\vec{x} - \vec{x_0})}{\left\|\vec{x} - \vec{x_0}\right\|^3} \qquad \text{(Eqn. 16)}$$

For large distances, the following relations hold where the proportionality indicates the term dominating on the way to infinity:

$$\lim_{\vec{x} \to \infty} \|\vec{x}\|^n d\vec{B_N} = \frac{\mu_0}{4\pi} \lim_{\vec{x} \to \infty} \|\vec{x}\|^n \frac{\frac{\partial^N}{\partial \vec{d}^N} d\vec{J} \times (\vec{x} - \vec{x_0})}{\left\|\vec{x} - \vec{x_0}\right\|^3} \propto \qquad \text{(Eqn. 17)}$$

$$\lim_{\vec{x} \to \infty} \|\vec{x}\|^n \frac{d\vec{J} \times (\vec{x} - \vec{x_0})}{\left\|\vec{x} - \vec{x_0}\right\|^{3+N}}$$

The derivation is carried out using relations for the generalized chain rule established by Fàa de Bruno [13]. We always find out that the limit for directions of escape parallel to the current result in a field with leading order n=N+2 and it is n=N+1 for directions of escape orthogonal to the current. On the other side, the direction of derivation has no influence on the leading exponent only the order of derivation!

Thus, the leading order of the N-th derivative of a current has the leading exponent of N+1 for any real direction at which the limit is taken.

Please note, that a thorough analysis of the electrodynamic case (not the static case considered here), yields that such higher order multipole sources still possess a far field. As a relief one finds out that—even though a far field exists—its contribution to the total emitted power is the smaller the higher order the multipole exhibits. This allows us to neglect the far field completely and study only the near field contents of the multipole source. For the near field it can be found (using the same repeated chain rule approach as above) that the field decays with higher leading exponents the higher order is considered.

How to construct a higher order derived current element?

Taking a derived source as outlined in the above process, we can approximate the current derivative by a difference expression (reciting a relation from above).

$$d\vec{B_1} = \qquad \text{(Eqn. 18)}$$

$$\frac{\mu_0}{4\pi} \lim_{\delta \to 0} \frac{1}{\delta} \left[ \frac{d\vec{J} \times \left(\vec{x} - \vec{x_0} - \frac{\delta}{2}\vec{d}\right)}{\left\|\vec{x} - \vec{x_0} - \frac{\delta}{2}\vec{d}\right\|^3} - \frac{d\vec{J} \times \left(\vec{x} - \vec{x_0} \mp \frac{\delta}{2}\vec{d}\right)}{\left\|\vec{x} - \vec{x_0} + \frac{\delta}{2}\vec{d}\right\|^3} \right] =$$

$$\frac{\mu_0}{4\pi} \frac{\frac{\partial}{\partial \vec{d}} d\vec{J} \times (\vec{x} - \vec{x_0})}{\left\|\vec{x} - \vec{x_0}\right\|^3}$$

It is just enough to stop the limiting process at distances very small to the wavelength. In this static reasoning, wavelength is infinite so we have to find another smallest distance we have to reach in order to get a reasonable representation of a derived source. It is clear that the fields associated with each individual term in the above difference relation must overlap. The fields are definitively present across the source itself. If we assume the source to have a geometrical size of D, fields overlap on scale of half of it. Then a practical implementation of such a source is given by:

$$d\vec{B_1} \approx \frac{\mu_0}{4\pi} \frac{2}{D} \left[ \frac{d\vec{J} \times (\vec{x} - \vec{x_0} - \frac{D}{4}\vec{d})}{\left\| \vec{x} - \vec{x_0} - \frac{D}{4}\vec{d} \right\|^3} - \frac{d\vec{J} \times (\vec{x} - \vec{x_0} \mp \frac{D}{4}\vec{d})}{\left\| \vec{x} - \vec{x_0} + \frac{D}{4}\vec{d} \right\|^3} \right]$$ (Eqn. 19)

Figure 5:
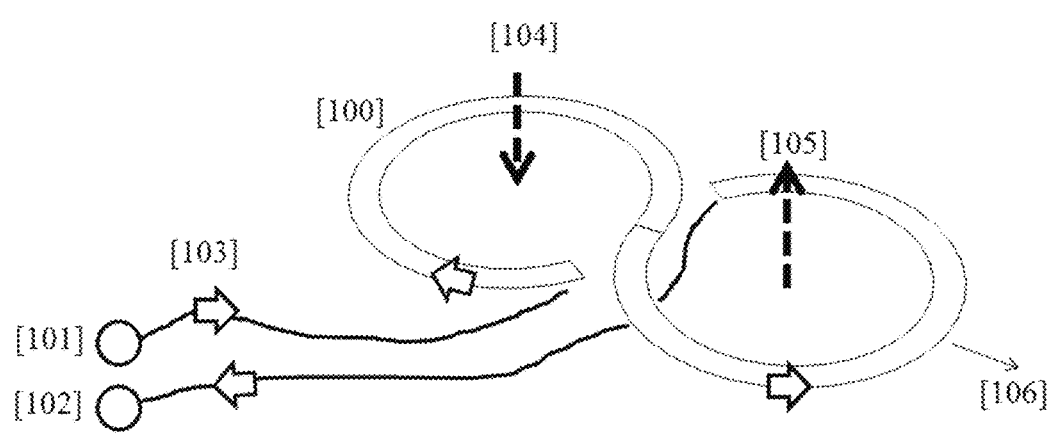
FIG. 5 shows an outline of a singly derived coil source.

FIG. 5 shows an embodiment of such a current source 100. The current is fed into the structure by terminals or pins 101 and 102. The direction of current is indicated by arrows 103. The direction of the derivative of the coil (d from the Equations) is indicated by the arrow 106. The generated dominating field components point upwards 105 and downwards 104 (relative the plane in which each coil is arranged) effectively forming the differential representation of the derivations.

The fields along the derivative vector decay with a leading exponent of 2 and with a leading order of 1 in the direction orthogonal to the derivative vector. As expected, by design, the field changes sign in the plane of symmetry. This causes a blind spot in the direction normal to the source plane.

Figure 3:
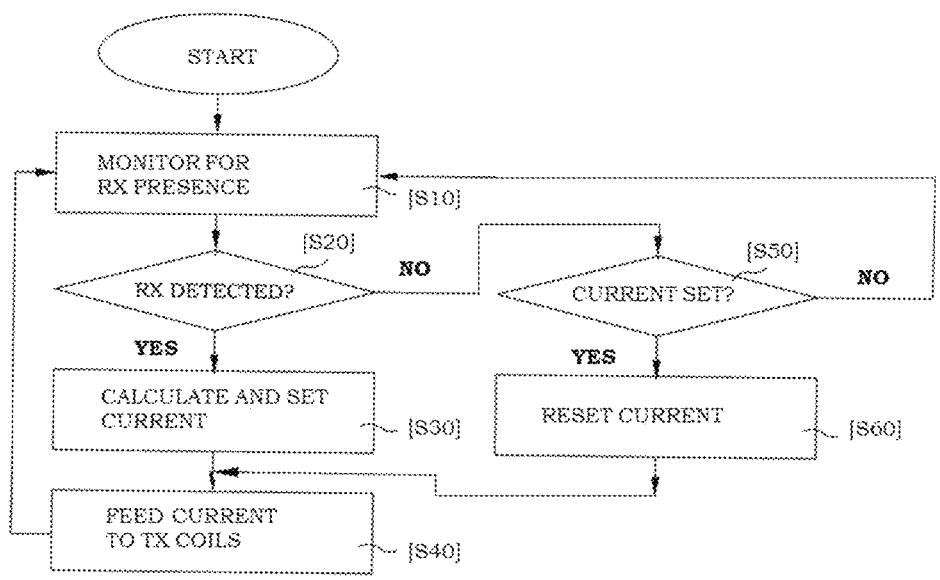
FIG. 3 is a block diagram of an evaluation procedure for the alignment criterion.
Figure 4:
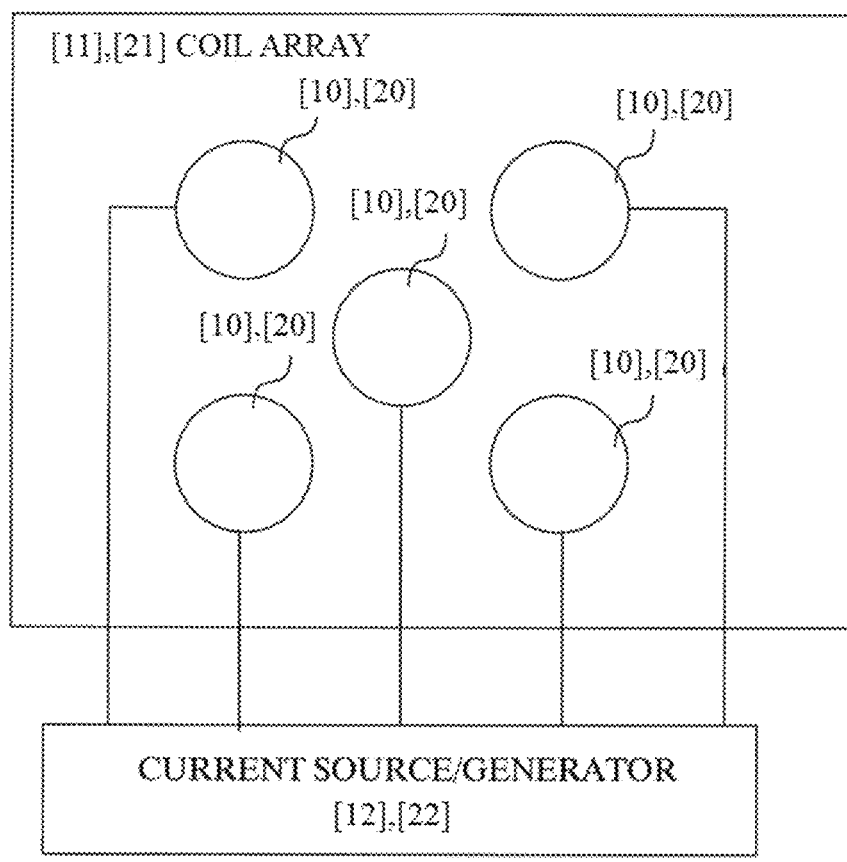
FIG. 4 is a block diagram of a coil array and a current source/generator of the power transfer system.

In order to avoid such blind spots in forward direction, even derivatives must be used. FIG. 3 indicates such an embodiment of a loop construction where a second derivative is used 110. The current is fed into the structure by pins 111 and 112. The direction of current is indicated by arrows 113. The direction of derivative of the coil (d from the Equations) is indicated by the arrow 116. The generated dominating field components point upwards 115 and downwards 114 effectively forming a differential representation of the second derivative in a specific direction Still, the field decays with leading exponent 1 in one direction and with exponent 2 in the direction of derivative.

Figure 7:
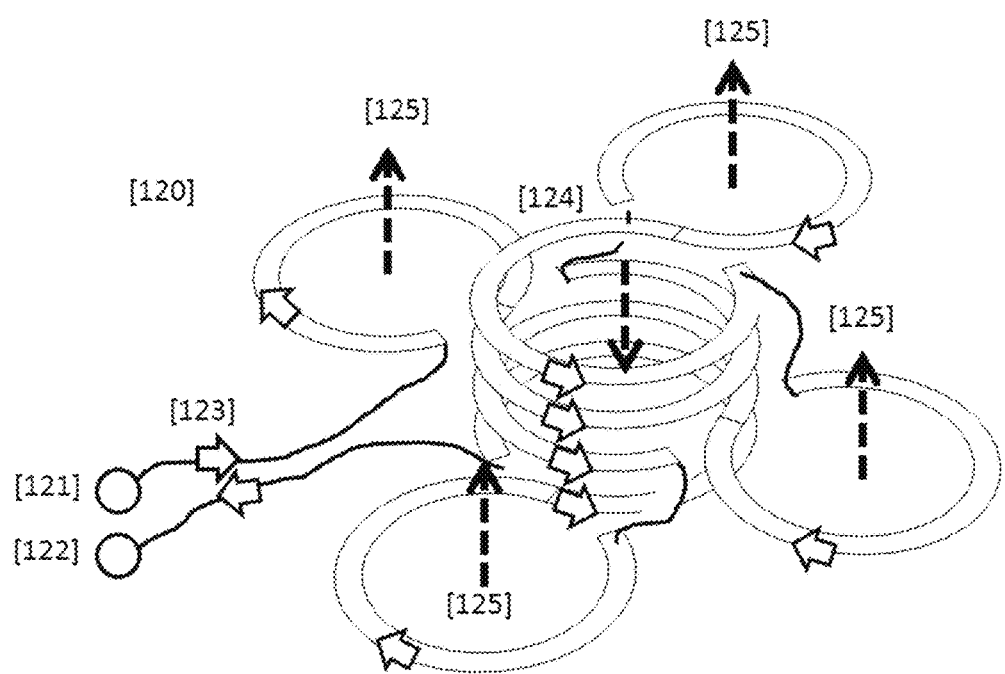
FIG. 7 is a first order representation of a $2^{nd}$ derivative coil source in two directions.
Figure 8:
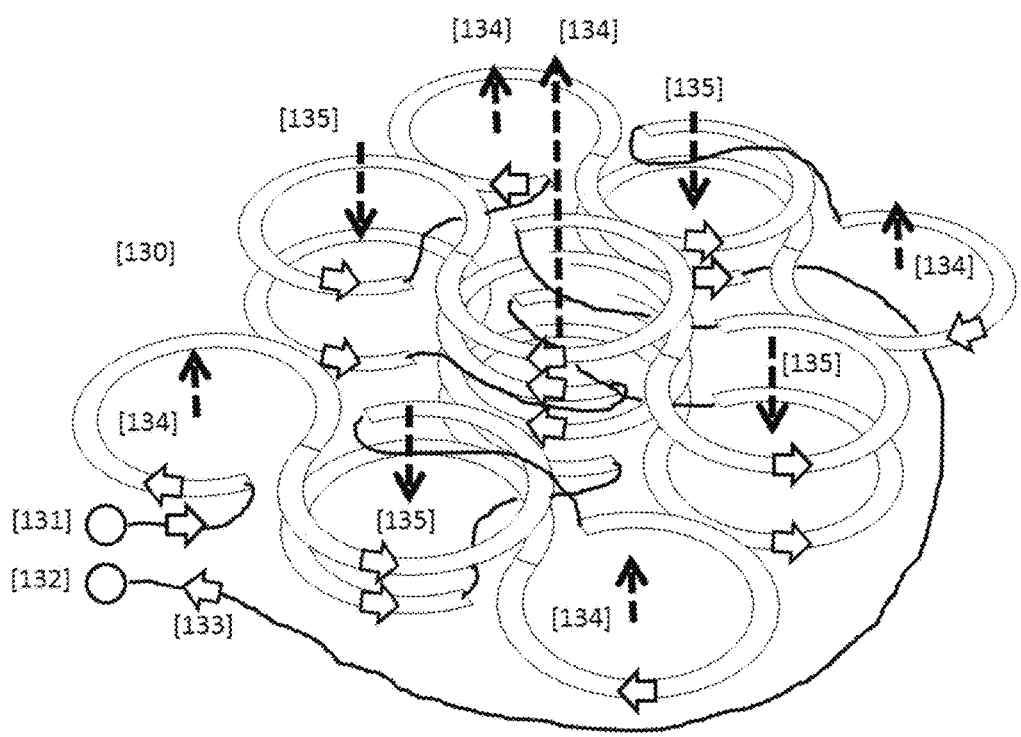
FIG. 8 is a $2^{nd}$ order representation of a $2^{nd}$ derivative coil source in two directions, FIG. 9 compares the fields caused by coils from FIGS. 2 through 5.

In order to achieve a field that decays with leading order 2 in all directions, we have to apply the derivation process in two orthogonal directions. This is shown in FIG. 7 depicting an embodiment of a first order $2^{nd}$ derivative coil source 120 in two directions. The current is fed into the structure by pins 121 and 122. The direction of current is indicated by arrows 123. The generated dominating field components point upwards 125 and downwards 124 effectively forming a differential representation of the second derivative in a two orthogonal directions. In this first order approximation, we arrive at 5 coils. The center coil carries 4 times more windings than the lateral coils. This representation resembles to the first order finite difference approximation of the Laplace operator in Cartesian coordinates. Nevertheless, the fields in directions "in between" the coordinate axes (at which the derivatives have been taken) has a slower decay than the fields in the directions of derivative even though all fields have leading order 2 in all directions. In order to improve the fields in all directions for close range stray field cancellation, we have to apply the derivation process in the second orthogonal direction on the representation of the first direction's derivative. This leads to an embodiment of a coil structure that is accurate in second order, which is shown in FIG. 8 showing a second order $2^{nd}$ derivative coil source 130 in two directions. The current is fed into the structure by pins 131 and 132. The direction of current is indicated by arrows 133. The generated dominating field components point upwards 135 and downwards 134 effectively forming a differential representation of the second derivative in a two orthogonal directions. In this second order approximation, we arrive at a total of 9 coils. The center coil carries 4 times more windings than the lateral coils, the coils along the axes of derivation −2 times the coil current of the outlying coils. This representation resembles to the second order finite difference approximation of the Laplace operator in Cartesian coordinates.

Figure 9:
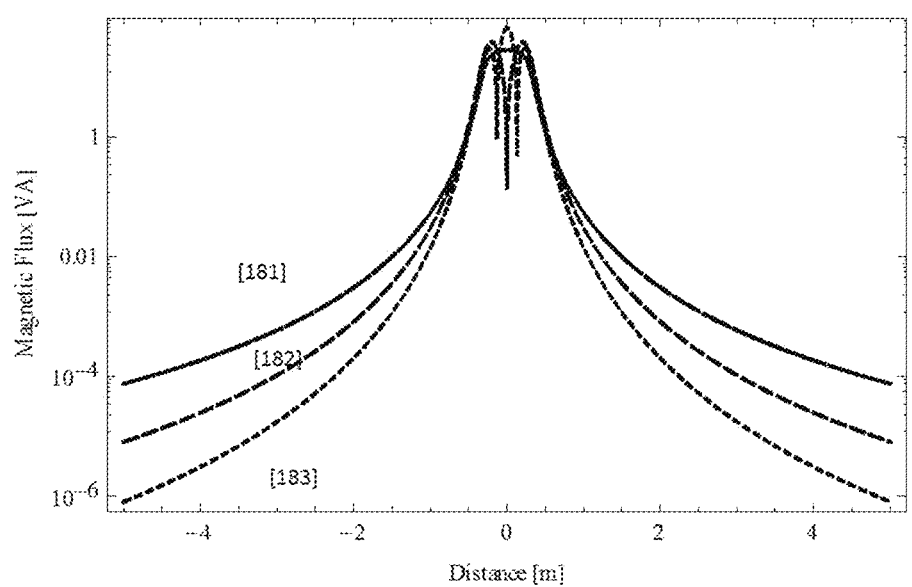

FIG. 9 depicts the magnetic flux density obtained for non-derived "traditional", derived and an embodiment according to the current disclosure with doubly derived coil structures. It is clearly seen that the embodiment of the derived coil structure cause a field that drops off much faster than the traditional coil structure. For the curves shown in FIG. 9 the coils are driven with a constant current of 1 A. Coil diameter is 20 cm and the magnetic flux is measured at 25 cm distance. The magnetic flux plotted in this FIG. 9 is the magnetic flux parallel to the coil axis of symmetry. The curve 181 depicts the magnetic flux of an ordinary coil. The reference number 182 depicts the magnetic flux of a first order derived coil and the reference number 183 is taken for a double derived coil structure.

Figure 20:
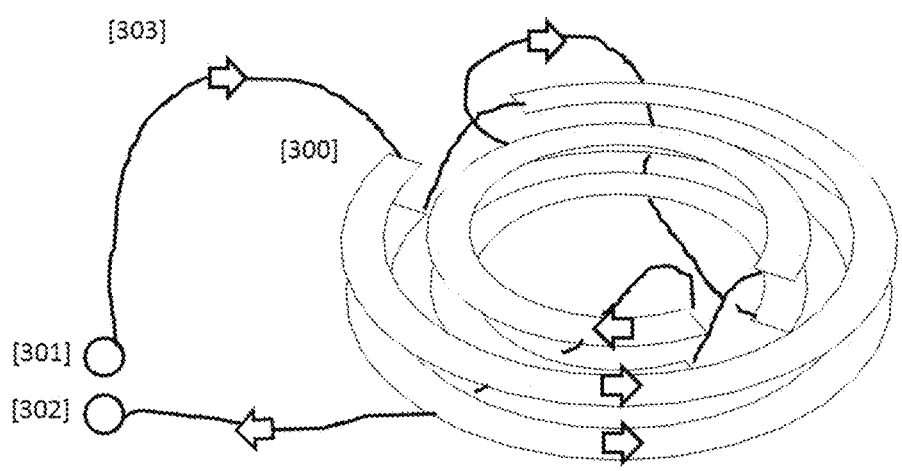
FIG. 20 is a schematic drawing of a set of a radially derived coil (300)

It is also possible to achieve a field that decays with leading order 2 in all directions, when we apply the derivation process radially. This is shown in FIG. 20 depicting an embodiment of a first order $1^{st}$ derivative coil source 300. The current is fed into the structure by pins 301 and 302. The direction of current is indicated by arrows 303.

Relation Between Multipole Coils and Non Radiating Currents

As pinpointed above, the discovery of non-radiating currents is not new. Nevertheless, from this point on, new aspects crucial for our invention are presented.

There are four main aspects.

1: Non Radiating Surface Currents

We have to extend the non-radiating (volume) currents to non radiating two-dimensional surface currents. For such a current sheet, the current distribution needs only to be a solution of a transverse Helmholtz equation on this surface.

$$\Delta_t \vec{J}_n - (k^2 - \mu)\vec{J}_n = 0$$ (Eqn. 20)

The 3D Laplace operator (in Cartesian coordinates) is given as $$\Delta = \frac{\partial^2}{\partial x^2} + \frac{\partial^2}{\partial y^2} + \frac{\partial^2}{\partial z^2}$$

and the transverse operator becomes $$\Delta_t = \frac{\partial^2}{\partial x^2} + \frac{\partial^2}{\partial y^2}.$$

It can be shown, that even the transverse Helmholtz equation yields a non-radiating current.

Now it is shown how such a non-radiating current on a surface can be built:

The simplest source of a current is a "peak" source current $\vec{J}_n = \delta_0(x - x_0)\hat{z}$ where $\delta_0(x - x_0)$ is the Heaviside distribution and $\hat{z}$ the unit vector in z-direction which is chosen orthogonal to x and y. Here we have to provide a Taylor series for the current solution $$\vec{J}_n = \sum_{i,j=0}^{\infty} \alpha_{i,j} \frac{1}{ij} \frac{\partial^i}{\partial x^i} \frac{\partial^j}{\partial y^j} \delta_0(\vec{x} - \vec{x_0})\hat{z} \quad \text{(Eqn. 21)}$$

Inserting the series from Eqn. 21 in the transverse Helmholtz equation Eqn. 20 yields a relation that must be fulfilled for any non-radiating current $$\frac{\partial^2}{\partial x^2} \sum_{i,j=0}^{\infty} \alpha_{i,j} \frac{1}{ij} \frac{\partial^i}{\partial x^i} \frac{\partial^j}{\partial y^j} \delta_0(\vec{x} - \vec{x_0}) + \quad \text{(Eqn. 22)}$$

$$\frac{\partial^2}{\partial y^2} \sum_{i,j=0}^{\infty} \alpha_{i,j} \frac{1}{ij} \frac{\partial^i}{\partial x^i} \frac{\partial^j}{\partial y^j} \delta_0(\vec{x} - \vec{x_0}) - -$$

$$(k^2 - \mu) \sum_{i,j=0}^{\infty} \alpha_{i,j} \frac{1}{ij} \frac{\partial^i}{\partial x^i} \frac{\partial^j}{\partial y^j} \delta_0(\vec{x} - \vec{x_0}) = 0$$

which can be simplified to yield:

$$\sum_{i,j=0}^{\infty} \alpha_{i+2,j} \frac{1}{ij} \frac{\partial^{i+2}}{\partial x^{i+2}} \frac{\partial^j}{\partial y^j} \delta_0(\vec{x} - \vec{x_0}) + \quad \text{(Eqn. 23)}$$

$$\alpha_{i,j+2} \frac{1}{ij} \frac{\partial^i}{\partial x^i} \frac{\partial^{j+2}}{\partial y^{j+2}} \delta_0(\vec{x} - \vec{x_0}) -$$

$$(k^2 - \mu)\alpha_{i,j} \frac{1}{ij} \frac{\partial^i}{\partial x^i} \frac{\partial^j}{\partial y^j} \delta_0(\vec{x} - \vec{x_0}) = 0$$

As expected, Eqn. 23 boils down to a hierarchical problem which is expressed in a relation between the multipole current coefficients $\alpha_{n,m}$.

There are thus two kinds of non-radiating currents. One is of even symmetry where all $\alpha_{n,m}$ where n or m are odd are zero and the initial element $\alpha_{0,0}=1$ $$\alpha_{n,m} = \frac{1}{2^{2+n+m}}(k^2 - \mu)\alpha_{0,0} = \frac{1}{2^{2+n+m}} \quad \text{(Eqn. 24)}$$

The odd symmetry currents are based on a nonzero element e.g. $\alpha_{1,0}=1$ where all even elements are zero. This invention makes use of current distributions of even symmetry but is not limited to that.

2: Multipole Expansion of Non Radiating Surface Currents

In order to construct a multipole source we apply the well-established method of discretization. For sake of simplicity, we limit the coefficients to a reasonable subset (e.g. $\alpha_{0,0}, \alpha_{2,0}, \alpha_{0,2}, \alpha_{2,2}$) Then we have to discretize the current functions associated with the coefficients $\delta_{0,0}, \delta_{2,0}, \delta_{0,2}, \delta_{2,2}$ on a regular grid. We implement the currents associated to a grid point by a coil. A section of an embodiment with such geometry is shown in FIG. 7.

Any function that can be written in terms of a Taylor series can be approximated by discretization the derivative terms:

$$\vec{J}_n = \sum_{i,j=0}^{\infty} \alpha_{i,j} \frac{1}{ij} \frac{\partial^i}{\partial x^i} \frac{\partial^j}{\partial y^j} \delta_0(\vec{x} - \vec{x_0})\hat{z} \approx \sum_{i,j=0}^{N} \alpha_{i,j} \frac{1}{ij} F_{i,j}\hat{z} \quad \text{(Eqn. 25)}$$

We obtain a recursion relation for the F's:

$$\frac{\partial^i}{\partial x^i}\delta_0 \approx F_{i,0} = \frac{\frac{\partial^{i-1}}{\partial x^{i-1}}\delta_0 \big|_{[x+\frac{d}{2},y]} - \frac{\partial^{i-1}}{\partial x^{i-1}}\delta_0 \big|_{[x-\frac{d}{2},y]}}{d} = \quad \text{(Eqn. 26)}$$

$$\frac{F_{i-1,0}\big|_{[x+\frac{d}{2},y]} - F_{i-1,0}\big|_{[x-\frac{d}{2},y]}}{d}$$

$$\frac{\partial^j}{\partial y^j}\delta_0 \approx F_{0,j} = \frac{\frac{\partial^{j-1}}{\partial y^{j-1}}\delta_0 \big|_{[x,y+\frac{d}{2}]} - \frac{\partial^{j-1}}{\partial y^{j-1}}\delta_0 \big|_{[x,y-\frac{d}{2}]}}{d} = \quad \text{(Eqn. 27)}$$

$$\frac{F_{0,j-1}\big|_{[x,y+\frac{d}{2}]} - F_{0,j-1}\big|_{[x,y-\frac{d}{2}]}}{d}$$

Applying Eqns. 26 and 27 twice, we obtain a recursion relation for the F's which reduces the order of the multipole by two in each direction:

$$\frac{\partial^i}{\partial x^i}\frac{\partial^j}{\partial y^j}\delta_0 \approx F_{i,j} = \quad \text{(Eqn. 28)}$$

$$\frac{-1}{d^2}\Big(-\sigma\big|_{[x-\frac{d}{2},y-\frac{d}{2}]} + 2\sigma\big|_{[x,y-\frac{d}{2}]} - \sigma\big|_{[x+\frac{d}{2},y-\frac{d}{2}]} +$$

$$2\sigma\big|_{[x-\frac{d}{2},y]} - 4\sigma\big|_{[x,y]} + 2\sigma\big|_{[x+\frac{d}{2},y]} -$$

$$\sigma\big|_{[x-\frac{d}{2},y+\frac{d}{2}]} + 2\sigma\big|_{[x,y+\frac{d}{2}]} - \sigma\big|_{[x+\frac{d}{2},y+\frac{d}{2}]}\Big)$$

With the following shorthand notation: $F_{i-2,j-2}=\sigma$

Please note that the results for $F_{2,2}$ are not the usual discretizations of the Laplace operator (which is only of first order).

These relations can be applied to generate any higher order poles. Examples for embodiments enabling such distributions of currents are found in FIGS. 7 and 8.

Thus, any non-radiating current can be expressed in terms of a multipole superposition

3: Error Convergence

When approximating a non-radiating current, the difference between the implemented current and the ideal non-radiating current will be a radiating current. Therefore, any practical implementation will have a certain stray field. It can be shown, that the stray field decreases as the approximation of the non-radiating current gets better.

4: Gauge Considerations

The derivation of non-radiating currents has been done under the assumption of a vector potential to be normalized using a Lorentz gauge. A similar reasoning can be set up with an electrostatic gauge as well.

Embodiments of the Transmitting Arrangement

Before proceeding to provide examples of the transmitting array we give a few clarifying notes that describes a general coil-structure.

Any coil structure can be described by a line of current in space. Any current element forming the line of current generates a magnetic and electric field. This has been stated by Biot, Savart and Maxwell and is known technology. Any structure of electric current can be mapped to a magnetic current in a way where magnetic and electric field change role. This concept has been introduced by Babinet and is also well known. Babinet also gives rules how to find an equivalent magnetic current distribution to any electric current distribution.

As a special case of Babinet's principle it may be stated that a coil wound around a certain direction in space and carrying an electric current generates the same field distribution as a magnetic current flowing in the same direction.

Furthermore any field calculation on coil-like curled, wound or twisted wire structures is greatly simplified by means of Babinet's technique by replacing any part forming a closed loop by a straight, short element of magnetic current.

In what follows there will be provided a number of possible embodiments laying out in more detail the features of a transmitting arrangement according to the proposed technology.

The transmitting arrangement forms part of a wireless power transfer system that consists of an array of transmit coil structures and an array of receive coil structures. These coil structures in turn consist of a set of wires. The coils and wires are arranged in space to yield a magnetic field. The generated magnetic field must however meet certain requirements to be useful in the proposed technology. It is therefore of importance that the coils and wires are arranged in space in a specific way and that they are fed with appropriate currents.

The purpose of the exemplary embodiments is to provide particular transmitting arrangements that comprises coil and wire structures for the transmit coils which, by cooperating with a control arrangement that controls the currents fed to the different coils and wires from a current source, renders a transmitting arrangement that fulfil the requirements relating to the magnetic field.

The transmit coil structures according to the proposed technology are attached to a suitable power generator or current source that is configured to produces a voltage and/or current signal at desired and controllable frequencies. The output signal from the power generator/current source is connected to a switch, or, equivalently, a control arrangement. This control arrangement is usually configured to distribute the power signal to one or more of the coil structures merely as a way to optimize power transfer. The proposed technology however provides a mechanism whereby considerations about the leak fields, or stray fields, of magnetic fields can also be taken into consideration when the current is distributed to the various coils and windings.

In the following there will be described a systematic way of how to design a geometry for the windings and coils of a transmitting array 11 to be used in a transmitting arrangement 1 for wireless exchange of energy with a receiving arrangement 2. The coils and the windings of the transmitting array are designed in such a way that a multipole non-radiating current distribution is generated during an inductive interaction with the receiving arrangement 2. As a consequence of choosing a transmitting array 11 and control arrangement 12 according to the proposed technology a reduction of the stray or leak parts of the magnetic field is reduced. This is advantageous since large magnetic fields might be used during wireless energy transfer and to shield the environment from the large fields the large distance components of the magnetic field should be reduced. The proposed technology therefor provides a transmitting arrangement that can be used safely even in environments comprising substances and living organisms that can be affected by substantial magnetic fields. The proposed technology can in particular be used to power vehicles wirelessly despite the fact that the vehicle may carry passengers. This is made possible due to control arrangement and the transmitting array according to the proposed technology.

In other words, it is provided a transmitting arrangement 1 for wireless exchange of energy with a receiving arrangement 2. The transmitting arrangement 1 comprises:

A transmitting array 11 comprising a plurality of transmitting coils 10. The array 11 is connected to a current source 12 feeding the plurality of coils with current.

A detector 13 arranged to detect the receiving arrangement 2.

A control arrangement 14 connected to the current source 12 and to each transmitting coil 10, where the control arrangement 14 is configured to control a current to each of the plurality of transmitting coils 10 to generate a joint current distribution for the transmitting arrangement 1, in response to a detected receiving arrangement 2.

The plurality of transmitting coils 10 are arranged so that they generate a multipole non-radiating current distribution during inductive interaction with the detected receiving arrangement 2 when fed with currents controlled by the control arrangement 14. This leads to a reduction of the stray field and thus enables a wireless exchange of energy between the transmitting arrangement 1 and the receiving arrangement 2.

So according to a first version of the proposed technology the control arrangement can be configured to provide each coil 10 within the transmitting array with a pre-determined individual current in order to obtain a joint non-radiating multipole current distribution.

The control arrangement 14 is in particular embodiments configured to control the currents fed to the plurality of coils by means of a programmable circuit. In such cases it is possible to program the control arrangement to feed pre-determined currents to the different coils in order to achieve a joint multipole non-radiating current distribution for the transmitting arrangement. The set of such pre-determined feed currents used in the transmitting arrangement will be referred to as a current scheme. Examples of how such current schemes are obtained will be provided later in the application. A particular embodiment of the control arrangement therefor provides for a control arrangement that is provided with access to at least one processor and a corresponding memory(s). The memory comprises instructions, which when executed on the processor cause the processor to provide the current scheme to the control arrangement 14 thus enabling the control arrangement to distribute currents to the coil arrangement of the transmitting array in such a way as to generate a joint non-radiating multipole current distribution.

A particular version also comprises a computer program that generates the current scheme that determines how the control arrangement shall distribute currents among the transmit coils. This computer program can be comprised in computer program product comprising a computer-readable storage medium having stored thereon the computer program.

In particular embodiments of the proposed transmitting arrangement the arrangement or the geometry of the plurality of coils can also be provided in a way that yields a non-radiating joint multipole current distribution. This is an alternative, or dual, way of solving the same problem. Hence in the version where the currents were chosen to yield the desired effect, it is possible to have a more or less ambiguous coil arrangement as long as the current control arrangement is programmed with relevant current schemes for the mentioned geometry. The arrangement or geometry of the coils on the other hand makes it possible to feed a single current to all coils in the arrangement. This might be preferable for certain applications. The alternative solution is therefor to design a transmit coil arrangement that yields a joint non-radiating multipole current distribution.

Even though it is possible to provide a control arrangement with pre-determined current schemes for feeding almost all coil structures, certain coil structures are more suited for particular uses. In particular the number of coils used and the arrangement of the coils in the transmitting array could be chosen to optimize both the robustness of the array as well as cost-considerations and the ease with which it is possible to generate a current scheme. Hence a number of different geometries will be described below.

In a possible embodiment of the transmitting arrangement is the transmitting array so arranged that is comprises a plurality of transmitting coils 10 comprising a first number of centrally located coils, also referred to as central coils 114, 124, 134 provided with a corresponding set of first windings, and a second number of laterally located coils, also referred to as lateral coils, 115, 125 135, provided with a corresponding set of second windings. The number of centrally located coils, and their corresponding first set of windings, and the number of laterally located coils, and their corresponding set of second windings being chosen so that the joint multipole current distribution generated when the central coils and the lateral coils are fed by currents controlled by the control arrangement 14 according to a pre-determined current scheme is non-radiating. This enables the transmitting arrangement to wirelessly transfer energy to the receiving arrangement in a secure way that reduces the stray or leak field of the magnetic field.

Figure 6:
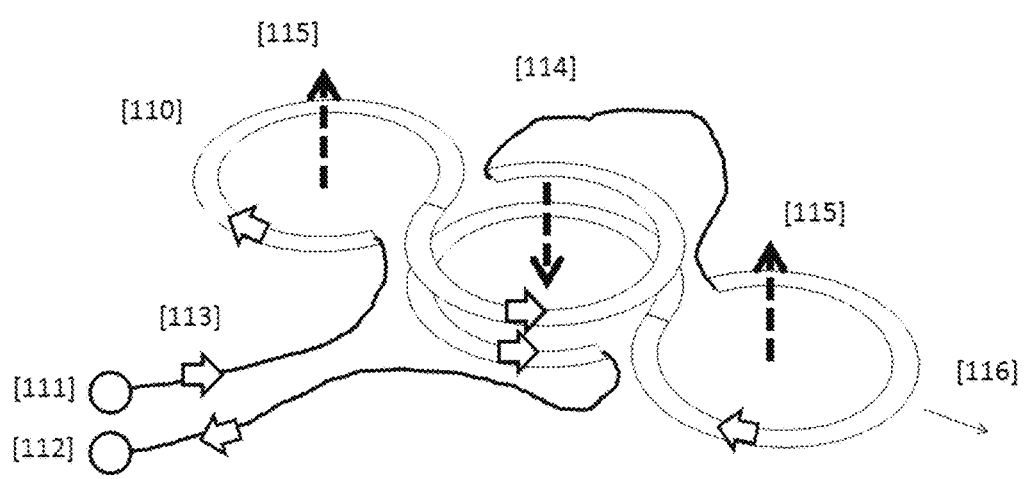
FIG. 6 shows an outline of a double derived coil source.

Illustrations of particular versions of such embodiments are provided by FIGS. 6, 7 and 8.

According to what has been described so far about the proposed transmitting arrangement it is clear that each coil structure, that is each of the plurality of transmit coils in the transmit array carries a specific current. This current is determined by the control arrangement and the strength of the current has in prior art merely been chosen in order to optimize power transfer but not to minimize the corresponding magnetic fields.

In order to reduce the magnetic field the inventors have realized that this can be achieved by providing the transmitting array 11 with certain coil structures that are chosen in order to form a non-radiating current when cooperating with the control arrangement. That is, when the control arrangement is programmed to provide each and every coil with a corresponding current in order to produce a non-radiating multipole current distribution.

In the low frequency limit where the wavelength of the used signal is much larger than the size of the charger, a non-radiating current becomes equivalent to a multipole current. The multipole of l-th order in one coordinate and the J-th order in the orthogonal coordinate ($\delta_{IJ}$) is represented by a current distribution according to the earlier given Equations 11 through 13.

Equations 11 and 12 provided earlier in the application are known as difference representation of a differential operator on an equidistant grid. Equation 13 is a practical consequence of 11 and 12 and can be obtained by applying 11 and 12 two times each on a current element. Relation 13, in turn, states a recursion relation where the multipole current distribution on a two dimensional array of points is expressed in terms of multipole having an order reduced by two in the coordinate directions.

In the following table, Table 1, the current distribution for the first even order symmetric multipole current distributions are given by applying Equations 26 through 27:

TABLE 1

List of the first current distributions of a multipole current

| I, J | Basis for individual coils in the array |
|---|---|
| 0, 0 | 1 |
| 0, 2 | −1 2 −1 |
| 0, 4 | 1 −4 6 −4 1 |
| 2, 2 | −1 2 −1 |
|  | 2 −4 2 |
|  | −1 2 −1 |
| 2, 4 | 1 −4 6 −4 1 |
|  | −2 8 −12 8 −2 |
|  | 1 −4 6 −4 1 |
| 2, 6 | −1 6 −15 20 −15 6 −1 |
|  | 2 −12 30 −40 30 −12 2 |
|  | −1 6 −15 20 −15 6 −1 |
| 4, 4 | 1 −4 6 −4 1 |
|  | −4 16 −24 16 −4 |
|  | 6 −24 36 −24 6 |
|  | −4 16 −24 16 −4 |
|  | 1 −4 6 −4 1 |
| 4, 6 | −1 6 −15 20 −15 6 −1 |
|  | 4 −24 60 −80 60 −24 4 |
|  | −6 36 −90 120 −90 36 −6 |
|  | 4 −24 60 −80 60 −24 4 |
|  | −1 6 −15 20 −15 6 −1 |
| 6, 6 | −1 6 −15 20 −15 6 −1 |
|  | 6 −36 90 −120 90 −36 6 |
|  | −15 90 −225 300 −225 90 −15 |
|  | 20 −120 300 −400 300 −120 20 |
|  | −15 90 −225 300 −225 90 −15 |
|  | 6 −36 90 −120 90 −36 6 |
|  | −1 6 −15 20 −15 6 −1 |

In Table 1, the left column is denoted I, J, where I and J refers to the above mentioned multipoles. That is, given a two dimensional coordinate system with coordinates x and y, I refers to a multipole of order I in the x-direction while J refers to a multipole of order J in the y-direction. In the right column of Table 1 there is disclosed a basis for the coil arrangement being used. The number of elements in the entries corresponds to the number of coils to be used and each single entry shows how the windings is to be arranged. A negative sign indicating that the current flowing through a particular coil arrangement of the transmitting array should be oppositely directed in comparison with a coil described by a positive sign. To provide an example of how the table should be read we first refer to FIG. 6. In FIG. 6 there is shown three coils, a central coil denoted 114 and two lateral coils denoted 115. The array of numbers in the right column are denoted −1 2 −1, three numbers are given corresponding to the number of coils used in the transmitting array. The number −1 denotes the current flowing through the lateral coils while the centrally located number 2 denotes the current flowing through the central coil. It can be seen that the orientation of the currents in the lateral coils are opposite to the direction of the current in the central coil. That is the windings of the various coils are arranged so that the joint current distribution yields a non-radiating current distribution. Hence in the case where a transmitting array should be fed currents in order to yield a I, J=0, 2 non-radiating joint multipole current a coil arrangement according to FIG. 6 could be used. It should be noted that the array, −1 2 −1, can be scaled by any number and still yield a non-radiating current since the windings of the various coils are chosen to accord for this. This is true for all entries in the table and this scaling can be used to generate a current scheme.

To further explain how the Table should be read reference is made to FIG. 7. In FIG. 7 there is shown 9 coils, a central coil 134 and eight lateral coils 135. This arrangement corresponds to the case of I, J=2, 2 in Table 1. Hence the central coil should be provided with 4 windings for a given current where the number 4 corresponds to the central location of the 3×3 array. The central coil is moreover flanked by eight lateral coils. The remaining numbers in the array provides the number of windings and the direction of currents of these coils.

This pattern continues and the I, J=4, 6 distribution, for example, comprises 7×5=35 transmit coils whose windings and current directions are provided by the 4, 6 entries in the table. The central coil for example has 120 windings for a given current and the remaining numbers of the 7×5 array provide a recipe for how to provide coils and windings for the remaining 34 coils in order to reduce the stray field of the magnetic field. As can be seen from the table the number of coils grows rather quickly for higher I and J, the entries in the right column can however be generated even for higher I and J by applying the recursive equations 26, 27 and 28' repeatedly. These equations are provided again for the convenience of the reader:

$$\frac{\partial^i}{\partial x^i}\delta_0 \approx F_{i,0} = \frac{\frac{\partial^{i-1}}{\partial x^{i-1}}\delta_0 \big|_{[x+\frac{d}{2},y]} - \frac{\partial^{i-1}}{\partial x^{i-1}}\delta_0 \big|_{[x-\frac{d}{2},y]}}{d} = \frac{F_{i-1,0}\big|_{[x+\frac{d}{2},y]} - F_{i-1,0}\big|_{[x-\frac{d}{2},y]}}{d} \quad \text{(Eqn. 26)}$$

$$\frac{\partial^j}{\partial y^j}\delta_0 \approx F_{0,j} = \frac{\frac{\partial^{j-1}}{\partial y^{j-1}}\delta_0 \big|_{[x,y+\frac{d}{2}]} - \frac{\partial^{j-1}}{\partial y^{j-1}}\delta_0 \big|_{[x,y-\frac{d}{2}]}}{d} = \frac{F_{0,j-1}\big|_{[x,y+\frac{d}{2}]} - F_{0,j-1}\big|_{[x,y-\frac{d}{2}]}}{d} \quad \text{(Eqn. 27)}$$

$$\frac{\partial^i}{\partial x^i}\frac{\partial^j}{\partial y^j}\delta_0 \approx F_{i,j} = \quad \text{(Eqn. 28)}$$
$$\frac{-1}{d^2}\Big(-\sigma\big|_{[x-\frac{d}{2},y-\frac{d}{2}]} + 2\sigma\big|_{[x,y-\frac{d}{2}]} - \sigma\big|_{[x+\frac{d}{2},y-\frac{d}{2}]} +$$
$$2\sigma\big|_{[x-\frac{d}{2},y]} - 4\sigma\big|_{[x,y]} + 2\sigma\big|_{[x+\frac{d}{2},y]} -$$
$$\sigma\big|_{[x-\frac{d}{2},y+\frac{d}{2}]} + 2\sigma\big|_{[x,y+\frac{d}{2}]} - \sigma\big|_{[x+\frac{d}{2},y+\frac{d}{2}]}\Big)$$

Applying Eqns. 26 and 27 twice, a recursion relation for the F's which reduces the order of the multipole by two in each direction is obtained.

Based on what has been described a particular exemplary embodiment of the proposed transmitting arrangement comprises a transmitting array 11 which in turn comprises a plurality of transmitting coils 10, where the plurality of transmitting coils are arranged to comprise a single central coil 114, 124, 134 and a plurality of lateral coils 115, 125, 135. The central coil 114, 124, 134 are provided with a first number of windings and the lateral coils 115, 125, 135 are provided with second number of windings for carrying current. The number of windings are chosen so that the central coil 114, 124, 134 and the lateral coils 115, 125, 135, when fed with current controlled by the control arrangement 14 produces a reduced stray field to enable wireless exchange of energy between the transmitting arrangement 1 and the receiving arrangement 2.

Still another particular example of an embodiment with a single central transmitting coil is schematically illustrated in FIG. 6, here the number of lateral coils is two and the number of windings of the central coil is twice the number of the corresponding windings of the lateral coils. Yet another example is provided by FIG. 7, here the number of lateral coils are four and the number of windings of the central coil is four times the number of the corresponding windings of the lateral coils, i.e. the lateral coils are provided with a single winding if the central coil is provided with four windings.

The entries in the right side of Table 1, therefore provides a basis for how to arrange the coil structures in a transmitting array. This can be used to design a transmitting array 11 to be used in the transmitting arrangement 1 according to the proposed technology. The basis provides the information that is needed to design and construct the coil arrangement of the transmitting arrays for particular values of the multipoles, I, J.

This feature enables a method whereby the coil arrangement of a transmitting array in a transmitting arrangement according to earlier described embodiments is constructed.

In other words there is provided a method for constructing a transmitting array that enables the generation of a multipole non-radiating current distribution, the method comprises the steps of:
  deciding S1 on the orders I, J of the multipole to be used;
  determining S2, the arrangement of a plurality of coils, to be used in the transmitting array and the number and orientation of the windings to be provided on each coil based on information that relates the number and orientation of the windings to be provided on each coil with the decided order of multipole, I, J;
  constructing S3 a transmitting array for a transmitting arrangement based on the determined number of coils and the determined number, and orientation, of the windings of each of the coils.

In a particular embodiment of the proposed method there is provided a method for constructing a transmitting array that enables the generation of a multipole non-radiating current distribution, the method comprises the steps of:
  deciding S1 on the orders I, J of the multipole to be used;
  determining S2, by using Table 1, a basis for the arrangement of a plurality of coils, the basis comprising the number of coils to be used in the transmitting array and the number and orientation of the windings to be provided on each coil;
  constructing S3 a transmitting array for a transmitting arrangement based on the determined number of coils and the determined number, and orientation, of the windings of each of the coils.

This method provides a recipe that enables a construction or design of a coil arrangement to be used in a transmitting array in a transmitting arrangement that is used for wireless transfer of energy between the transmitting arrangement and a detected receiving arrangement. By constructing the transmitting arrangement according to the proposed method the stray field will be reduced which enables a secure and robust wireless transfer of energy.

All the described embodiments of the transmitting arrangement may be provided with a transmitting array constructed according to the method, so according to an embodiment of the proposed technology there is provided a transmitting arrangement 1 that comprises:

A transmitting array 11 comprising a plurality of transmitting coils 10. The array 11 is connected to a current source 12 feeding the plurality of coils with current and is constructed according to the described method.

A detector 13 arranged to detect the receiving arrangement 2.

A control arrangement 14 connected to the current source 12 and to each transmitting coil 10, where the control arrangement 14 is configured to control a current to each of the plurality of transmitting coils 10 to generate a joint current distribution for the transmitting arrangement 1, in response to a detected receiving arrangement 2.

The plurality of transmitting coils 10 in the transmitting array being arranged to generate a multipole non-radiating current distribution during inductive interaction with the detected receiving arrangement 2 when fed with currents controlled by the control arrangement 14.

This particular embodiment provides a transmitting arrangement that yields a reduced stray field and thus enables a wireless exchange of energy between the transmitting arrangement 1 and the receiving arrangement 2.

As has been described earlier, the proposed technology provides two alternative ways of solving the problem of reducing the stray field. That is one version provides a way to arrange the plurality of coils in the transmitting arrays with regard to the number of coils and the number of windings and the orientation of the windings for each coil. The other version provides a way whereby the control arrangement is configured to distribute different currents to each coil. That is, the control arrangement is configured to distribute the currents according to a determined current scheme. The difference between these are that the arrangement of the plurality of coils and windings allow the same current to be fed to all coils, something that might be useful in certain applications. The dual arrangement of having a programmed control arrangement might on the other hand have a fixed number of coils where all coils are provided with a fixed number of windings.

The use of Table 1 for constructing the transmit array has been described. It should however be noted that the same Table can be used as a blue-print for obtaining the current scheme that the control arrangement should use to distribute currents to the various coils. The use of Table 1 for this particular solution will be explained in relation to the I, J=0, 2 multipole but the more general use for higher order or multipoles will be obvious.

In the I, J=0, 2 case, the table provides the following array, −1 2 −1, the numbers refer to the orientation of the windings and the number of windings of the three coils. For the present solution it could instead be viewed as a recipe for determining the strength of the current to be distributed to the different coils. Hence, assume that the windings of the lateral coils, corresponding to the −1 coils as specified by the entry, have a specific orientation and the central coil, corresponding to the 2 in the entry have opposite orientation. Assume further that the number of windings of each coil is the same and interpret the numbers 1 2 1 of the entry as the size of the current to be fed to each coil. Hence the central coil will be fed with a current that is twice as large as the currents fed to the lateral coils. In this way Table 1 also provides a way to program the control arrangement. So in the case where one has two possible coils, one having a first orientation and the other the opposite orientation but the same number of windings. In this case it will be possible to program the control arrangement so that the transmit coils generate a non-radiating multipole current distribution despite having only two types of coils. It is of course possible to scale the currents to be fed to the coils if the coils have different number of windings. This is straightforward if the concept has been understood. The alternative solution therefore enables a transmitting arrangement with all the positive effects while at the same time demanding a smaller number of coil types.

The proposed technology therefor provides a method performed by a control arrangement that enables the control arrangement to distribute specific currents to different coils in a transmitter array in order to generate a non-radiation multipole current distribution. The method comprises the steps of:

deciding S1 on the orders I, J of the multipole to be used;
determining S20, the currents to be provided to each of the coils in a plurality of coils by based on information that relates the currents to be fed to each coil with the decided order of a multipole, I, J;
distributing S30 the determined currents to each of the coils in the plurality of coils in the transmitting array.

A control arrangement configured to perform the above given method can be used in the transmitting arrangement according to the proposed technology.

A particular embodiment of the proposed method provides a method performed by a control arrangement that enables the control arrangement to distribute specific currents to different coils in a transmitter array in order to generate a non-radiation multipole current distribution. The method comprises the steps of:

deciding S1 on the orders I, J of the multipole to be used;
determining S20, by using Table 1, the currents to be provided to each of the coils in a plurality of coils;
distributing S30 the determined currents to each of the coils in the plurality of coils in the transmitting array.

We will now proceed and describe how to generate the appropriate current distributions or, equivalently, the coil arrangement for specific applications. These are non-limiting examples and are merely given to give as simple examples as possible.

In order to design an efficient wireless power transfer system, several constraints have to be fulfilled. In particular a certain power density level has to be provided within a certain volume at the same time as emission requirements are fulfilled at predetermined distances.

To provide a description that facilitates the understanding of the concept we provide a number of possible applications where the proposed technology can be used. First we describe how to generate the appropriate current distributions for stationary power transfer and after that the current distribution of an arrangement that can be used in mobile power transfer will be highlighted.

The following example is provided as an aid to clarify the concepts relating to arrangement geometries for stationary power transfer.

Assume that a car is to be charged with 3.5 kW. The 3 dB power density sphere around the transmitter is assumed have a radius of 0.1 m. The power density within this sphere becomes then 850 kW/m$^3$. In order to not subject passengers and bystanders to a large magnetic field, e.g. a field exceeding 5.6 µT, which corresponds to a power density of 2.1 mW/m³, the stray field or leak field should be reduced. Assume, for this particular example, that the stray field, or leak field, is measured at a distance of one meter from the field maximum. To reduce the stray field to levels below 5.6 µT, the power has to decay by a factor $4\times10^8$ from 0.15 m to 1 m distance. Fields therefore have to decay by a factor 20000 (square root of $4\times10^8$). The decay of the fields is given by an exponent n and a scaling coefficient a, together with the following relation:

$$\frac{a}{0.1m^n} < 20000 \frac{a}{1.0m^n}$$

In the present example at least n>5.6 is required. Following the above Table 1, we have to choose e.g. a multipole of minimum order I=J=6. It is therefore needed an array with 7×7 coils (I=J=6) to be active and the following currents to be programmed into these coils (c.f. last entry in Table 1) provided below for convenience:

| −1 | 6 | −15 | 20 | −15 | 6 | −1 |
|---|---|---|---|---|---|---|
| 6 | −36 | 90 | −120 | 90 | −36 | 6 |
| −15 | 90 | −225 | 300 | −225 | 90 | −15 |
| 20 | −120 | 300 | −400 | 300 | −120 | 20 |
| −15 | 90 | −225 | 300 | −225 | 90 | −15 |
| 6 | −36 | 90 | −120 | 90 | −36 | 6 |
| −1 | 6 | −15 | 20 | −15 | 6 | −1 |

Hence by following the logic of this example it will be possible to provide a coil and winding arrangement that reduces the magnetic field and thus enables an efficient and secure wireless power transfer.

The following example is provided as an aid to clarify the concepts relating to arrangement geometries for mobile power transfer.

A car is to be charged with 3.5 kW when moving. The 3 dB power density sphere around the transmitter is assumed have a radius of 0.1 m. The power density within this sphere then becomes 850 kW/m³. Passengers and bystanders should not be subject to a magnetic field exceeding 5.6 µT corresponding to a power density of 2.1 mW/m³. The requirement for bystanders in front and behind a moving car are lower. Here, the imposed limit of 5.6 µT should be reached about 2 meters in front of the charger and 2 meters behind the charger. For the passengers and the lateral bystanders, the example given with regard to stationary transfer of energies applies. The order of multipole in lateral direction is thus 6 at minimum. For a person in front or behind the car, we have to fulfil:

$$\frac{a}{0.1m^n} < 20000 \frac{a}{2.0m^n}$$

In our example at least n>3.9 is required. Following the above Table, we have to choose e.g. a multipole of minimum order I=4 and J=6.

We thus need an array with 5 coils (I=4) in direction of the car motion to be active and 7 coils (j=6) in the lateral direction to be active and the following currents to be programmed into the coils (c.f. second last entry in Table 1):

| −1 | 6 | −15 | 20 | −15 | 6 | −1 |
|---|---|---|---|---|---|---|
| 4 | −24 | 60 | −80 | 60 | −24 | 4 |
| −6 | 36 | −90 | 120 | −90 | 36 | −6 |
| 4 | −24 | 60 | −80 | 60 | −24 | 4 |
| −1 | 6 | −15 | 20 | −15 | 6 | −1 |

Still another application of the proposed technology relates to mobile power transfer with only lateral stray field reduction and the arrangement geometry associated with that particular example will be given below.

For a wirelessly charged means of transport, where the track is free of persons, the only requirement is to protect lateral bystanders and passengers. Placing the passengers at a distance of two meters from the charger, and charging with the same power levels as in the above examples we find that a multipole order of 4 is sufficient. For such a track based application, it will be possible to provide the complete track with coils and program the coils as follows (c.f. applying the third entry in Table 1 repeatedly):

| 1 | −4 | 6 | −4 | 1 |
|---|---|---|---|---|
| 1 | −4 | 6 | −4 | 1 |
| 1 | −4 | 6 | −4 | 1 |
| 1 | −4 | 6 | −4 | 1 |
| 1 | −4 | 6 | −4 | 1 |
| 1 | −4 | 6 | −4 | 1 |
| 1 | −4 | 6 | −4 | 1 |
| 1 | −4 | 6 | −4 | 1 |
| 1 | −4 | 6 | −4 | 1 |
| 1 | −4 | 6 | −4 | 1 |
| 1 | −4 | 6 | −4 | 1 |
| 1 | −4 | 6 | −4 | 1 |
| 1 | −4 | 6 | −4 | 1 |
| 1 | −4 | 6 | −4 | 1 |
| 1 | −4 | 6 | −4 | 1 |
| 1 | −4 | 6 | −4 | 1 |
| 1 | −4 | 6 | −4 | 1 |
| 1 | −4 | 6 | −4 | 1 |

It should be emphasized that only a fraction of the coils—those located under the vehicle—need to be activated in this application Yet another possible embodiment relates to high frequency wireless power transfer. The following example discloses how the proposed technology can be used in this embodiment.

First note that there are two kinds of non-radiating currents. One is of even symmetry where all $\alpha_{n,m}$ where n or m are odd are zero and the initial element $\alpha_{0,0}=1$.

$$\alpha_{n,m} = \frac{1}{2^{2+n+m}}(k^2 - \mu)\alpha_{0,0} = \frac{1}{2^{2+n+m}} \quad \text{(Eqn. 24)}$$

The odd symmetry currents are based on a nonzero element e.g. $\alpha_{1,0}=1$ where all even elements are zero.

For applications, where the low frequency limit stated by Biot-Savart's law is no longer strictly applicable, non-radiating currents and multipole currents lead to different current distributions.

Applying the above relation we obtain the following set of values, where rows are given by n and columns by m:

| −1 | 2 | −1 |
|---|---|---|
| 2 | −4 + $k^2$ | 2 |
| −1 | 2 | −1 | instead of the low frequency result:

$$\begin{array}{ccc} -1 & 2 & -1 \\ 2 & -4 & 2 \\ -1 & 2 & -1 \end{array}$$

Here k is given by, $k=\omega\sqrt{\epsilon\mu}$, where $\omega$ stands for the angular frequency. Both solutions become identical in the low frequency limit k=0. Higher order non-radiating current are obtained in the same way.

Below there is provided a step by step procedure of how a wire structure is generated based on the above matrix elements:

1: As a first step, determine the size of the coil structure array that is allowable in two dimensions forming a plane. We assume in this step tacitly that the extension in the third dimension normal to the surface is small. This need not be the case but is most often.

2: Having the above current distribution matrix, count the number of nonzero cells in columns and rows.

3: Choose a characteristic length by dividing the array size allowable in a specific direction by the number of row elements and take the other planar direction divided by the number of column elements. It is preferred if the result is two lengths smaller than the wavelength. In a typical application representative values are around 10 cm-30 cm.

4: Form a raster in row and column direction covering the foreseen array surface where each entry in the matrix is assigned a point given by the indices of the matrix elements multiplied by the above characteristic lengths.

5: Place a coil with the number of turns given in the matrix element at the point corresponding to the matrix element on the array surface. Chose a coil with the characteristic lengths as diameters. This yields elliptical coils where one half axis has the length of the first characteristic length, the other half axis has the second characteristic length. Each coil has now a top end and a bottom end.

6: Start with one arbitrary end, assume here a top end of an arbitrary coil. Connect this to one terminal of the switch unit (or directly to the power unit). Connect now the bottom end to a piece of wire.

7: Chose another not yet connected coil. Turn the coil upside-down (to revert the winding sense) and connect the former top (now bottom end) to the said piece of wire from point 6.

8: Take the actual top end, attach another piece of wire.

9: In case no further unconnected coils can be found, attach the last piece of wire to the second, up to now open terminal of the generator or to the second terminal of the switch unit and stop the process.

In case there are unconnected coils left, chose another not yet connected coil. Connect the said wire piece from 8 to its top end. Turning is not required. Connect now the bottom end to another piece of wire.

10: In case no further unconnected coils can be found, attach the last piece of wire to the second, up to now open terminal of the generator or to the second terminal of the switch unit and stop the process.

In case there are unconnected coils left, go to point 7.

The synthesis of a multipole structure is thus finalized, as soon as all coils have been connected following the above process.

It should be emphasized that it is possible to multiply all numbers of coil windings in a structure by a constant factor.

It should be noted that negative numbers occurring in the matrix are reflected by turning the coil upside-down and assuming a number of windings to be the absolute value of the number.

It should also be noted that non-integer numbers of windings, e.g. x, can be represented as coils where the total amount of angles subtended by the wire corresponds to $2\pi x$. In this case, the top and bottom connection point are not located on the same point when projected from above. It is nevertheless more advisable to multiply the overall coil winding numbers by the largest common denominator to arrive at integer winding numbers for all parts of the structure How this Invention is Used With the above considerations we know now how to construct a transmitting arrangement 1 for wireless exchange of energy according to the current disclosure.

Besides a transmitting arrangement 1 there must also be receiving arrangement 2. The transmitting arrangement is characterized by a transmitting array 11 comprising a plurality of transmitting coils 10. This transmitter array 11 is connected to a current source 12. There is also a detector 13 arranged to detect a receiving arrangement 2 and a control arrangement 14 connected to the current source 12 and to each transmitting coil 10, which control arrangement 14 is configured to control a current to each of the plurality of transmitting coils 10 to generate a joint current distribution for the transmitting arrangement 1, in response to the detected receiving arrangement 2.

This plurality of transmitting coils 10 is configured to interact inductively with the receiving arrangement 2 to enable wireless exchange of energy between the transmitting 1 and the receiving arrangement 2. The transmitting arrangement 1 can be configured to approximate a non-radiating current by a superposition of multipole non-radiating current distributions during inductive interaction with the detected receiving arrangement 2.

This transmitting arrangement 1 can, according to one embodiment, be configured to be placed adjacent to a ground surface. This transmitting arrangement 1 can also, according to a further embodiment, be configured to be placed in or below a road surface to enable inductive energy transfer to a receiving resonator arrangement in a vehicle. Furthermore, the transmitting arrangement 1 can be configured such that a detector arrangement 13 can be configured to detect the receiving arrangement 2 in response to an alignment criterion. This alignment criterion is a measure for the transmitting arrangement 1 and the receiving arrangement 2 to have a predetermined spatial orientation in relation to each other.

The transmitting arrangement 1 can additionally be configured such that the plurality of coils 10 is arranged in a two or three dimensional structure in a common plane. This allows to use the coil structure on conformal surfaces as well.

Now, there is a receiving arrangement 2 for wireless exchange of energy with a transmitting arrangement 1 that is characterized by an array 21 comprising of a plurality of receiving coils 20 connected to a current converter 22. This plurality of resonator coils 20 is configured to interact inductively with the transmitting arrangement 1 comprising a plurality of transmitting coils, to enable wireless exchange of energy with the transmitting arrangement 1 and to provide a current to the current converter 22.

According to an additional embodiment, receiving arrangement 2 is also characterized by the plurality of receiving coils 20 to be configured to receive a generated non-radiating current distribution during inductive interaction with the transmitting arrangement 1.

According to a further embodiment, the receiving arrangement 2 is also characterized by the plurality of receiving coils 20 to be arranged in a two or even three dimensional structure in a common plane. This common plane can also be the bottom or top surface of a vehicle.

It is understood, that, among other application fields, this invention can be used on vehicles, where the receiving arrangement is mounted on the vehicle. It can also be used for power transfer between a vehicle and a trailer where the transmitting arrangement 1 or generator is mounted on a vehicle and the receiving arrangement 2 or receiver is mounted on a trailer. Having a power generator 1 on the trailer, the transmitting arrangement 1 is placed on the trailer and the receiving arrangement on the vehicle 2.

Summarizing any system for wireless energy exchange, the system comprising at least one transmitting arrangement as described above and at least one receiving arrangement according to the above description are claimed as part of the invention.

It is clear that in the above system, the plurality of transmitting coils 10 and the plurality of receiving coils 20 can be arranged in identical arrays.

The system can, according to a particular embodiment, be so arranged in a way to enable wireless exchange of transfer if at least one transmitting arrangement 10 and at least one receiving arrangement 20 are aligned with each other according to a predetermined alignment criterion. Thus transmission arrangements 10 or receiving arrangements 20 may actually be inactive momentarily when an alignment criterion indicates this to be favourable.

A method for wireless energy transfer between a transmitter arrangement 1 and a receiver arrangement 2 according to the above described embodiments will be described with reference to FIG. 3. The alignment criterion is evaluated as shown in FIG. 3. From the start point the evaluation enters state S10. In this state, the presence of a receiver arrangement 2 is tested using e.g. a RX detector 13. This can be done by RFID, by ultrasound or by applying a test current to the coils. If no RX is detected, the evaluation enters S50. If a RX is detected, the current control S30 is activated to calculate the appropriate current and the appropriate coil to be fed.

In case S30 has been reached, the coils are fed with the calculated currents in state S40 and the evaluation goes back to S10.

In case S50, it is checked if a current has been set. If a current has been set, the currents are reset S60 and the evaluation goes back to S10. If no current has been set, the evaluation goes back to S10 directly. It is ensured that no current is put on the coils when no receiver arrangement 2 is present.

Below a plurality of example embodiments of the above described arrangements will follow. In particular, the configuration of the transmitting and receiving coil arrays will be described.

Example Embodiments

1: Improved Narrow Side Coupler

Figure 10:
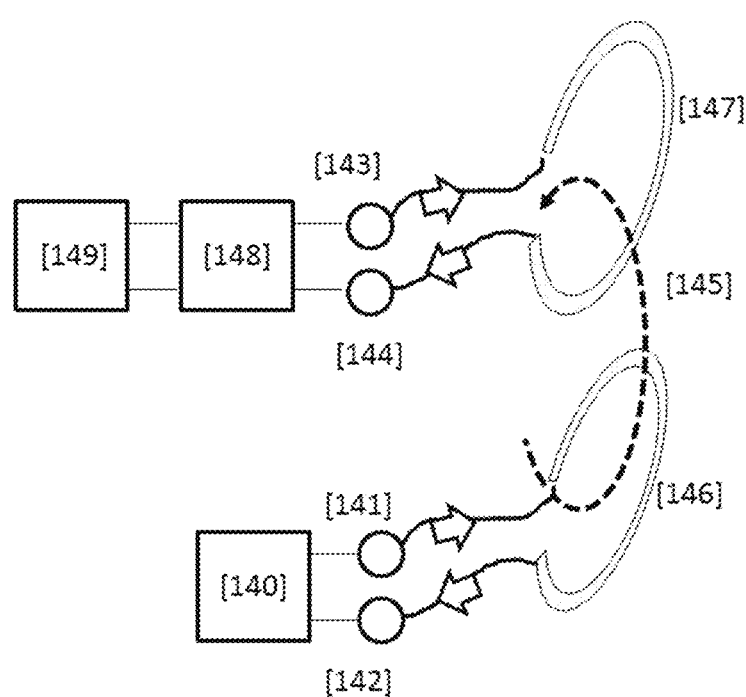
FIG. 10 is a schematic drawing of a narrow-side coupled wireless power transfer system.
Figure 11:
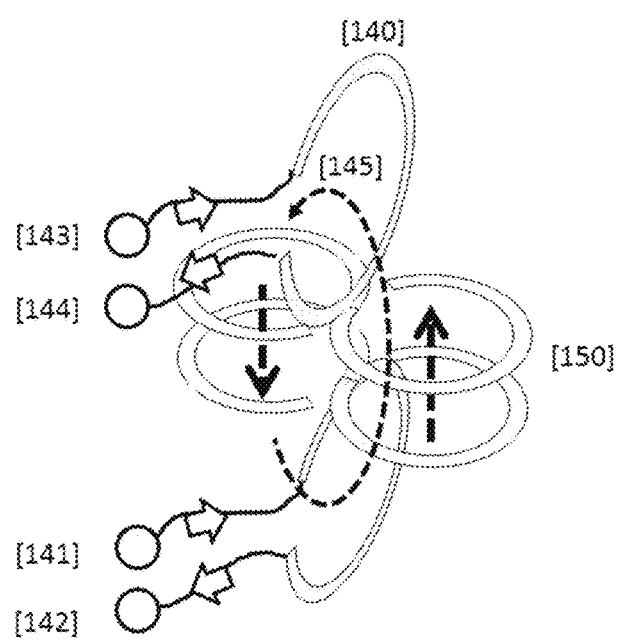
FIG. 11 depicts how to transform a narrow side coupled transfer system to a broadside coupler.
Figure 12:
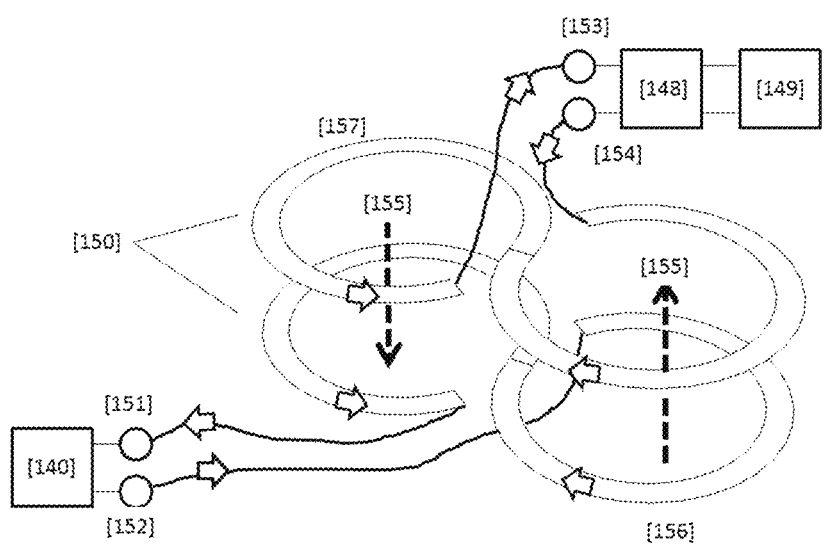
FIG. 12 shows the equivalence of the broad side coupled equivalent to the narrow side coupled power transfer system from FIG. 7.

It is found that the best coupling between arbitrarily placed current elements (with respect to distance) are obtained when the transmitter element is placed in the same plane as the emitting current element. Today most wireless chargers rely on transmitters and receivers placed in different planes (broadside coupling) which results in a reduced range and efficiency. Narrow-side coupling is known to be more efficient but has some practical disadvantages: Usually power transmitters are intended to be flat plate-like structures. This is not possible with a traditional narrow-side coupler. Here it is shown that narrow-side coupled pair of coils can be replaced by a broadside pair of first order derived coils. FIG. 10 depicts the coupling geometry of a narrow-side coupler system. A driver unit 140 provides suitable high frequency power signals at a set of terminals 141,142 are coupled to a transmitter loop 146. The transmitter loop 146 causes a magnetic field 145 to couple to a receiver loop 147 in a narrow-side configuration. The receiver loop 147 is connected to terminals 143,144 at which the received power is sent to a rectifier unit 148 which is coupled to the application 149. How to replace the narrow side coupler by a broad side derived coil coupler is shown in FIG. 11. Here the narrow side coupler is overlaid with a new derived coil coupler system. One sees that the field configuration in the coupler remains at least at first approximation unchanged. In FIG. 8 the drivers and application units 140,148,149 are omitted. We add a first order derived coil system 150 to the narrow-side coupler. This added coil system is in the configuration of a broadside coupler. FIG. 12 depicts how a broad side derived coil coupler is configured. The approach with derived coils is required as soon as a wireless charger coil must be operated close to metallic surfaces such as bolts filled that carry the power transfer electronics in a compartment and where only the transfer coils have contact to the outside. FIG. 12 shows a schematic drawing of the broad side coupled equivalent to the narrow side coupled power transfer system shown previously in FIG. 7. Again, a driver unit 140 provides suitable high frequency power signals at a set of terminals 151,152 are coupled to a transmitter loop 156. The transmitter loop 156 causes a magnetic field 155 to couple to a receiver loop 157 with the appropriate direction in each coil. The receiver loop 157 is connected to terminals 153,154 at which the received power is sent to a rectifier unit 148 which is coupled to the application 149 as in the narrow side configuration. Terminal 151 connects to 141, 142 to 152, 143 to 153, and 144 to 154 when the narrow side coupled coils are replaced by derived coils 150.

2: Three Phase Power Transmitter

Figure 2:
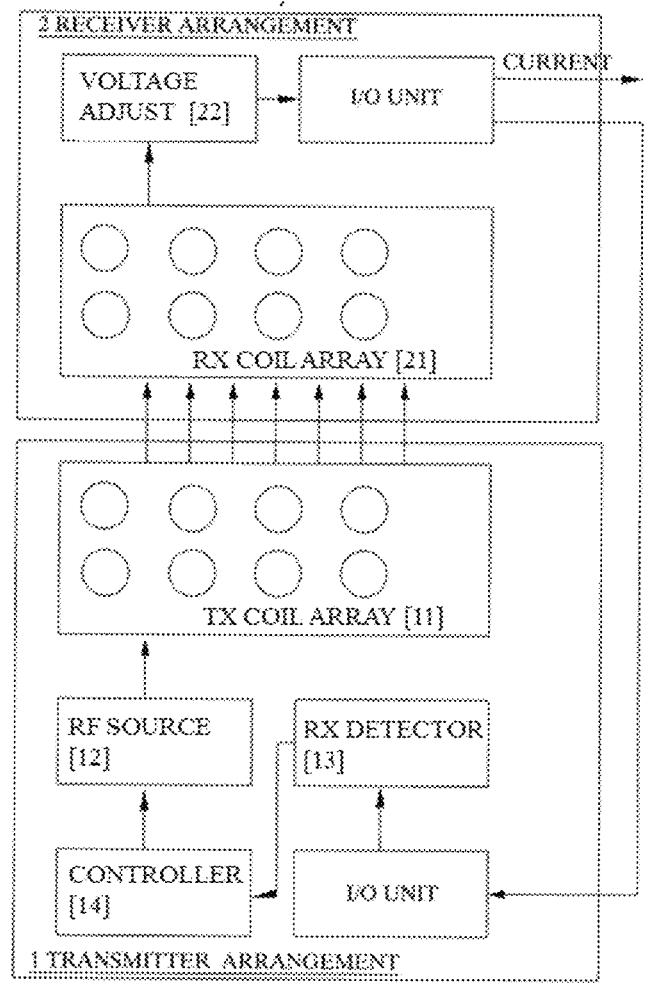
FIG. 2 is a more detailed block diagram of a power transfer system.
Figure 13:
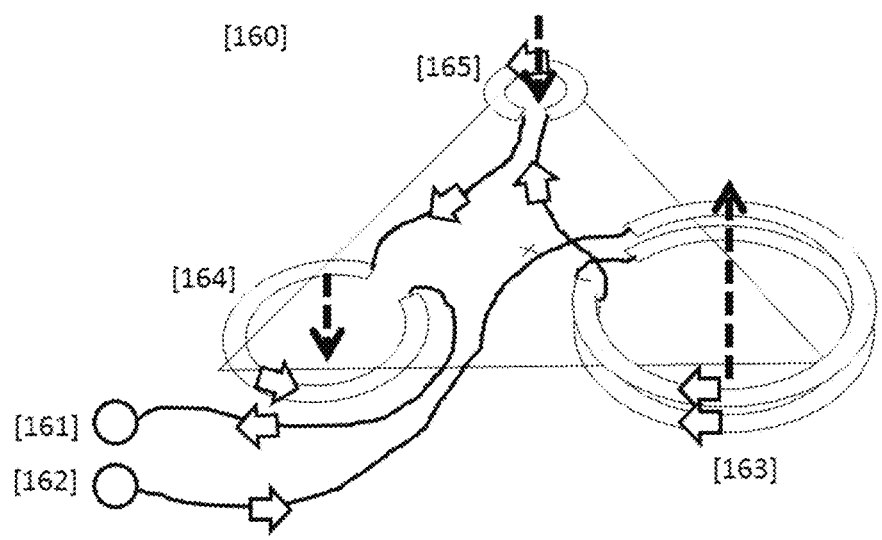
FIG. 13 is a first order 1st derivative coil source with 120 degrees symmetry.
Figure 14:
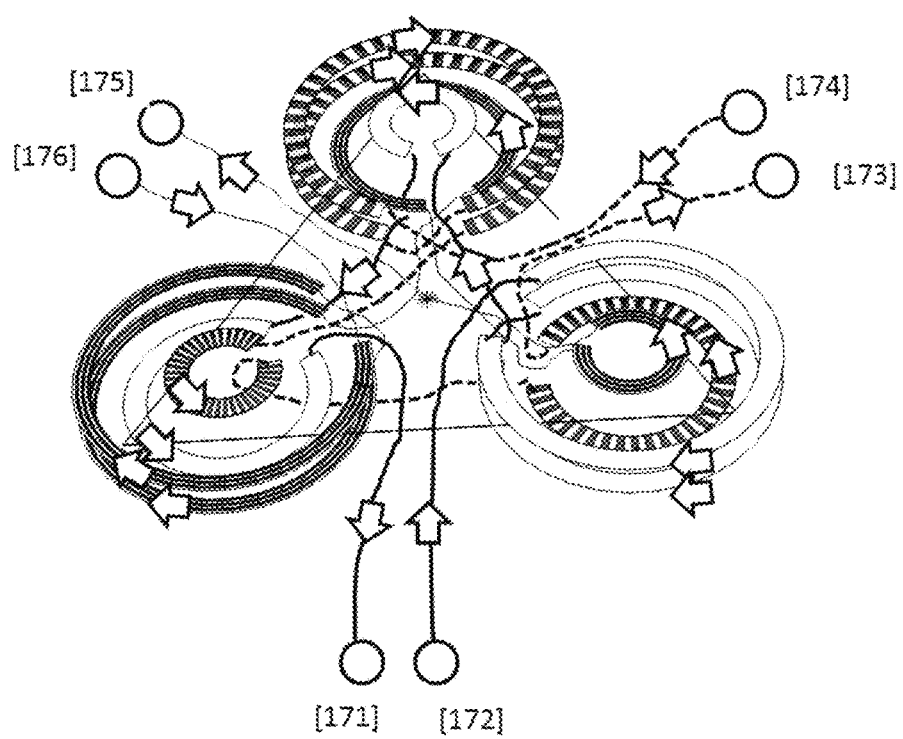
FIG. 14 shows a schematic drawing of three 120 degrees coil systems from FIG. 13 stacked to form a three phase transmitter or receiver system.

A multiphase transmitter follows the same structure as FIG. 1. The only difference is that the number of outputs to the coils are increased to allow all phase signals to be transmitted. In case of a three phase wireless power transmission system, it is important to separate the three phases and keeping the dimensions of the coupler as small as possible. For this purpose a coil system with three coils has been devised. There are two coils 161,162 with the same number of windings (here shown with smaller diameter in order to allow stacking of three identical coil systems without mechanical interference) and a main coil 163 with opposite sense and more windings than the first two coils. Often, the main coil will have 2 times more windings than the smaller coil which leads to an effective first order derived coil but this invention is not limited to this case. FIG. 13 shows such a first order 1st derivative coil source 160 with a 120 degrees symmetry. This coil is typically used as part of a receiver but also as transmitter in three phase applications. The coils are operated in series ensuring the field to have different polarity in 163 than in 161 and 162 indicated by arrows 165,165. Note that the three phases to be transferred can be frequency converted to a higher frequency signal with suitable phase difference. This higher frequency signal is transferred across the coil system. For one phase this is shown in FIG. 13, three identical systems are superimposed to form a three phase system 160 as shown in FIG. 14 to form a three phase transmitter or receiver system 170. The first signal relating to the first ac phase is coupled to terminals 171 and 172. The second signal relating to the second ac phase is coupled to 173,174, the third to 175,176 respectively. Arrows indicate the direction of current (assuming all current to be in phase for sake of simplicity)

Figure 16:
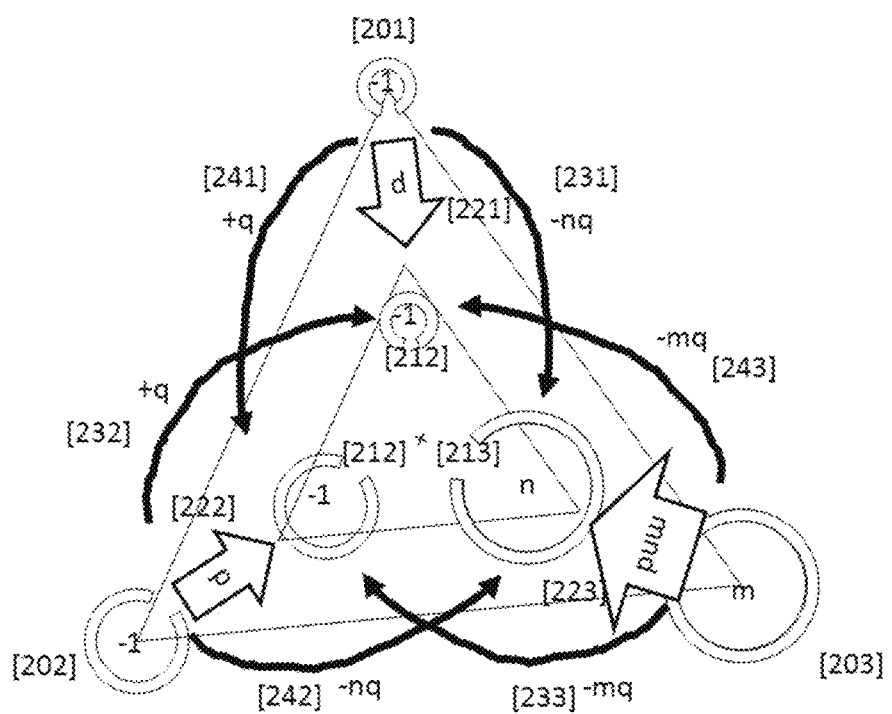
FIG. 16 shows the coupling strength between two 120 degree symmetry coil systems from FIG. 13.

Operating such a three phase coil system leads to two distinct cases:

The "good" case occurs when the transmitter and receiver main coil are close to each other and one of the three phases adds up maximally in the receiver coil. This case is depicted in FIG. 16. There we assume a transmitter coil system 201,202,203 and a receiver coil system 211,212,213 where 203 denotes the main coil with "m" times more windings than the smaller coils 201,202 and where 213 denotes the main receiver coil with "n" times more windings than 211,212. The direct coupling strength "d" refers to interaction to the most adjacent coils 221,222,223 and the other indirect coupling strength "q" denotes the coupling between coils that are not adjacent. This FIG. 16 illustrates the "good" case where the coils are spatially in phase (receiver main coil is closest to transmitter main coil)

Figure 17:
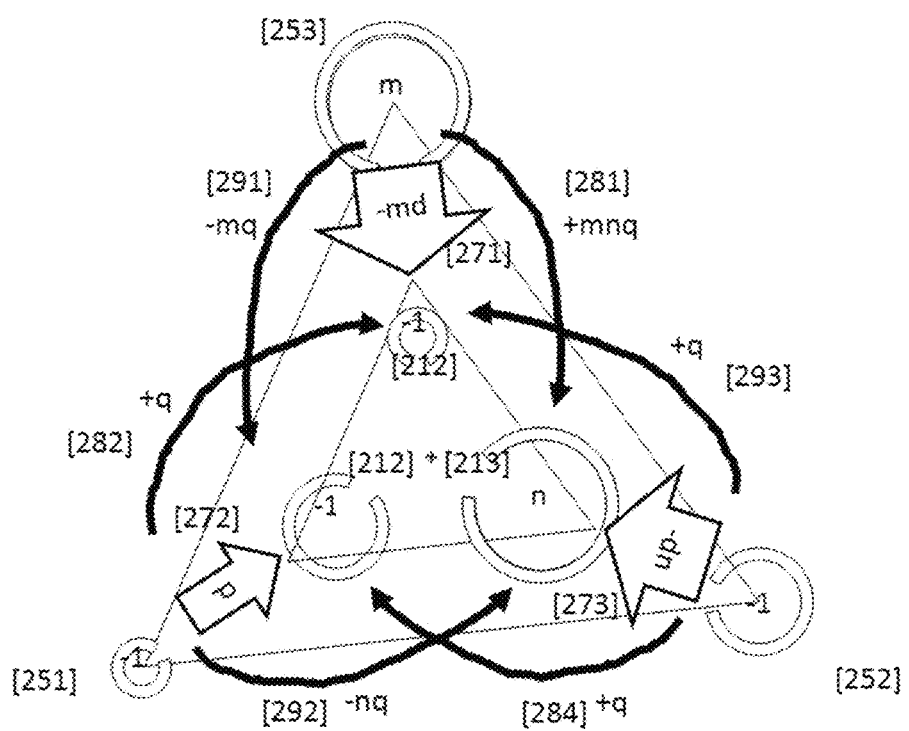
FIG. 17 shows the optimized coupling strength between two 120 degree symmetry coil systems from FIG. 13.

The "bad" case occurs when the transmitter and receiver main coil are out of phase and the receiver will couple to one of the other phases. This case is depicted in FIG. 17, which contains a coupling diagram between two 120 degree symmetry coil systems from FIG. 13. Assume a transmitter coil system 201,202,203 and a receiver coil system 251,252,253 where 203 denotes the main coil with "m" times more windings than the smaller coils 201,202 and where 213 denotes the main receiver coil with "n" times more windings than 251,252. The direct coupling strength "d" refers to interaction to the most adjacent coils 271,272,273 and the other indirect coupling strength "q" denotes the coupling between coils that are not adjacent. This Figure illustrates the "bad" case where the coils are spatially not in phase (receiver main coil is not closest to transmitter main coil)

In a real system, both cases are present simultaneously. Thus, the output of each receiver coil system will be a mixture of the three phases fed into the transmitter. This is a situation that is common to traditional three phase power transmitters. In contrast to the traditional transmitters, we can adjust the winding ratio of the transmitter (and or receiver) coil appropriately to separate the phases completely.

Figure 15:
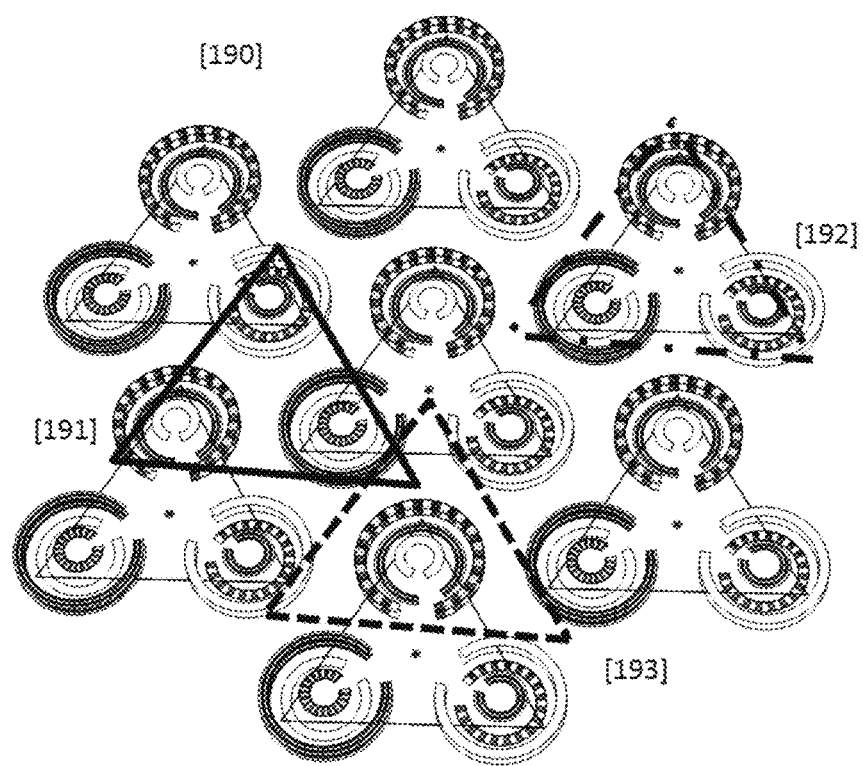
FIG. 15 is a schematic drawing of a set of three phase transmitters forming an active three phase surface.

For this, we need to analyze the situation from the coupling diagrams in FIGS. 14 and 15.

First, we have to calculate the coupling between two coils placed in different planes.

Without loss of generality, let us discuss the typical case of a coil with coil axis parallel to a coordinate z and coils extending in the orthogonal x-y plane. With a small spiral height parameter "h" and "n" windings, we can calculate the magnetic flux in the coordinate space assuming vacuum everywhere to be given by the following integral relation along the wire:

$$\vec{B} = \frac{\mu_0}{4\pi} \int_{\varphi=0}^{2\pi n} \vec{b}\left(\vec{x}, \vec{x_0} + r\begin{bmatrix}\cos\varphi\\ \sin\varphi\\ \frac{\varphi}{2\pi}h\end{bmatrix}, j_0\begin{bmatrix}-\sin\varphi\\ \cos\varphi\\ 0\end{bmatrix}\right) d\varphi \quad \text{(Eqn. 28)}$$

In the above relation, the infinitesimal field $\vec{b}(\vec{x}, \vec{x_0}, j_0)$ is obtained by evaluating Biot-Savart law.

$$\vec{b}(\vec{x}, \vec{x_0}, j_0) = \frac{d\vec{j} \times (\vec{x} - \vec{x_0})}{\|\vec{x} - \vec{x_0}\|^3} \quad \text{(Eqn. 29)}$$

The coupling to another coil located in the x-y plane is then determined by Faraday's law. It describes the voltage induced along a wire located on the boundary of the surface integral over the magnetic flux:

$$EMF \propto \int\int \frac{\partial}{\partial t}\vec{B} \cdot dx dy \quad \text{(Eqn. 30)}$$

Then the coupling between two coils is given by a value with units of impedance which can be suitably normalized (e.g. to the maximum EMF induced with the same coil current when the coils are placed at closest distance that is mechanically feasible):

$$c = \frac{EMF}{j_0} \frac{j_0}{EMF_{max}} \quad \text{(Eqn. 31)}$$

From this calculation, we can obtain a value for the direct coupling "d" and for the cross coupling "q" where we often find that direct coupling dominates the process:

$$d > q \quad \text{(Eqn. 32)}$$

So we may express the cross coupling as a fraction of the direct coupling with a scaling coefficient $\alpha \leq 1$:

$$q = \alpha d \quad \text{(Eqn. 33)}$$

Generally the scaling coefficient α being ratio between direct and cross coupling is fairly constant over a wide range of distances. For very large distances, the physical length between a "good" and a "cross" coupling is equal which leads forces $\alpha \to 1$. For (unrealistically) short distances, the "good" coils are almost in contact and the distance to the cross coils comparably large implying which leads to a $\alpha \to 0$. In more typical cases, where the transmitter-receiver coil distance is about the distance between the main and the satellite coils the distance between the direct and cross coils scales with the square root of 2 leading to a typical value of the scaling coefficient around $0.6 < \alpha < 0.8$.

Taking the coupling schematics from FIG. 16, we arrive at a total coupling between the coil systems in the "good" and from FIG. 17 for the "bad" case to be the sum of all direct and all indirect couplings weighed with the number of winding and with the sign of their orientation respectively to be:

$$EMF_{good} = d(2+nm) + 2(2-(m+n))q \quad \text{(Eqn. 34A)}$$

$$EMF_{bad} = d^*(1-(m+n)) + q^*(3+nm-(m+n)) \quad \text{(Eqn. 34B)}$$

We can eliminate the coupling to the wrong phases ("bad" case, Eqn. 34B) by properly design of the receiver coil structure. The receiver main coil winding number must be chosen to be:

$$n = \frac{1 - m + 3\alpha - m\alpha}{1 + \alpha - m\alpha} \quad \text{(Eqn. 35)}$$

Then the coupling to the correct phase becomes:

$$EMF_{good,0} = 2d\alpha\left(2 - m - \frac{1-m+3\alpha-m\alpha}{1+\alpha-m\alpha} + \ldots + d\left(2 + \frac{m(1-m+3\alpha-m\alpha)}{1+\alpha-m\alpha}\right)\right) \quad \text{(Eqn. 36)}$$

Figure 18:
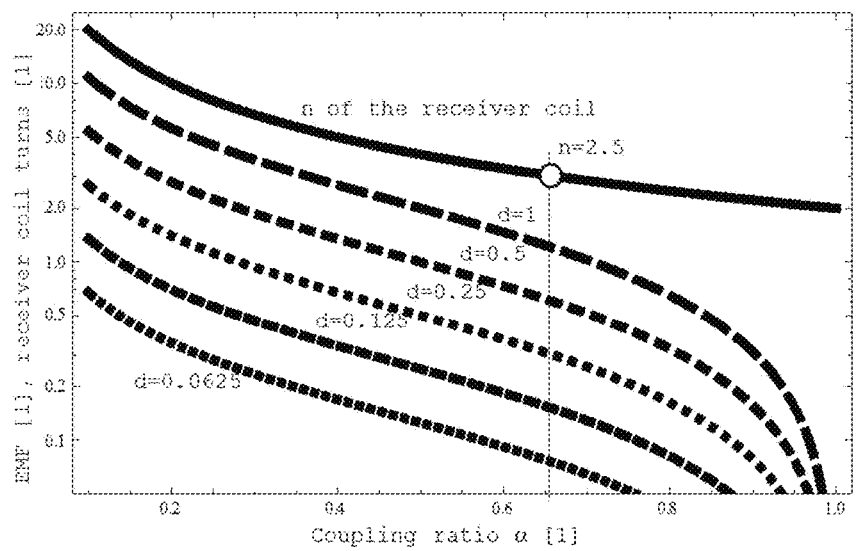
FIG. 18 shows the induced EMF for a set of normalized coupling factors for a large number of windings on the transmitter coil (m>10)

For a case of large m the results for the coupling from Eqn. 36 are plotted in FIG. 18 which depicts curves for the induced EMF for a set of normalized coupling factors starting with maximum coupling factors d=1, and weaker coupling factors d=0.5, d=0.25, d=0.125 and d=0.0625. The top curve indicates the winding ratio for the receiver coil. Since the induced EMF is normalized, the maximum EMF one can get out of the coil is equal to the winding of the receiver. The curves are obtained for transmitters with a large number of main coil turns (m>10). This case corresponds in the limit where only the main coils for the transmitter are present. In order to cover a reasonable distance, a receiver coil ratio of n=2.5 will cancel the wrong phases.

Figure 19:
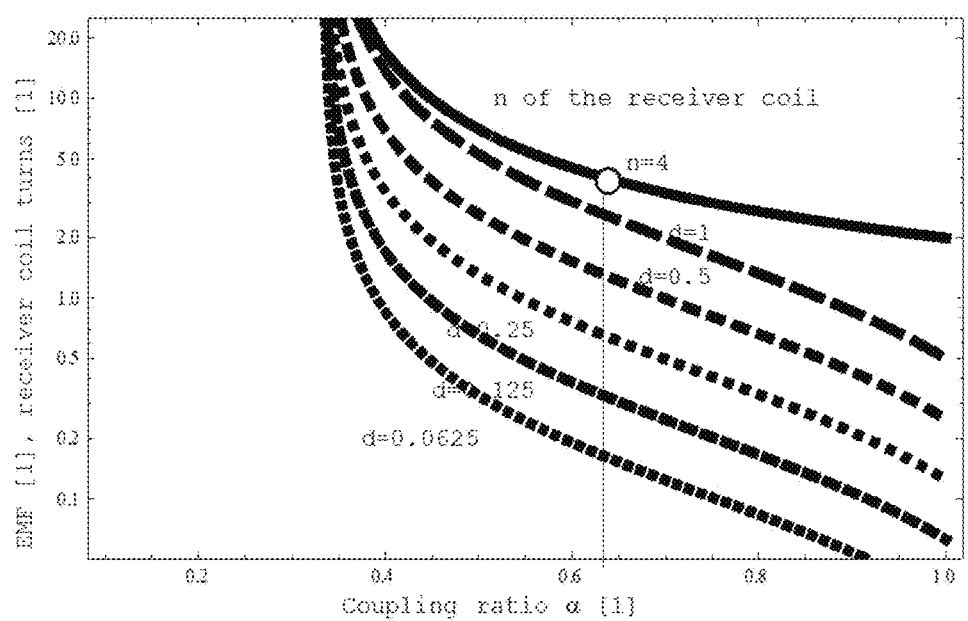
FIG. 19 shows the induced EMF for a set of normalized coupling factors for the optimum case (m=4)

For the typical case m=4 the results for Eqn. 36 are plotted in FIG. 19. Here cancellation occurs at n=4. FIG. 19 shows the induced EMF for a set of normalized coupling factors starting with maximum coupling d=1 and decreasing from d=0.5, d=0.25, d=0.125 and d=0.0625. The top curve indicates the winding ratio for the receiver coil. Since the induced EMF is normalized, the maximum EMF one can get out of the coil is equal to the winding of the receiver A larger array of such three phase coils is most suitable to charge large loads where the actual position is not known. Providing two receive coil systems with a distance not commensurate with the transmitter system will always yields a significant power transfer irrespectively of position. Such a setup is shown in FIG. 20.

3: Power Coupler to Moving Objects

Figure 21:
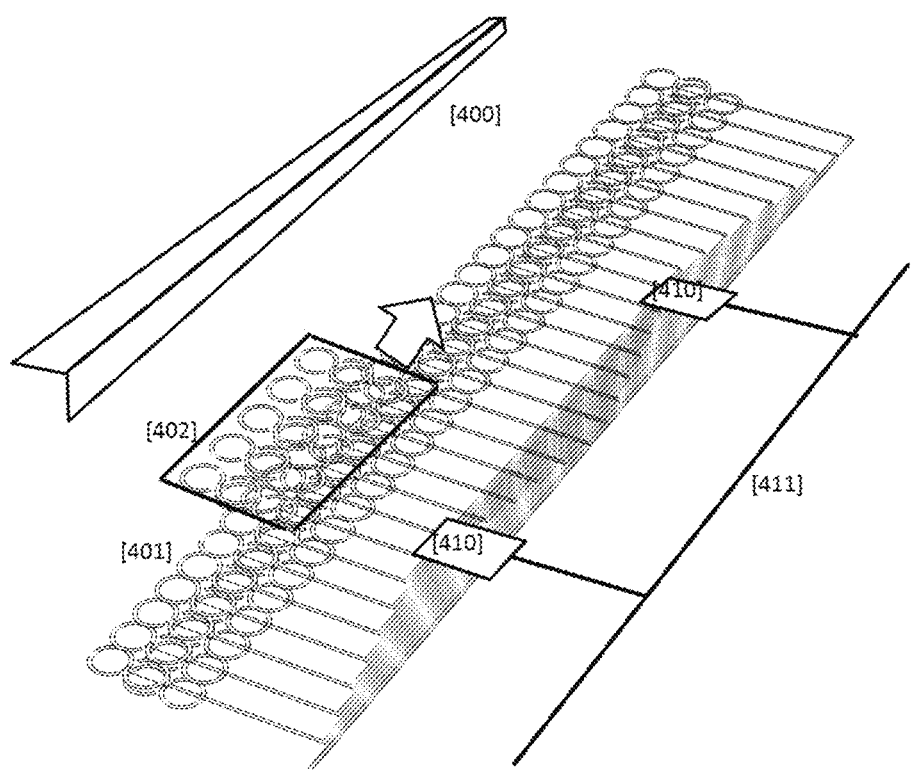
FIG. 21 is a schematic drawing of a set of derived coils (205) buried in a roadway where the receiver coils are optimized for power reception.

The invention can be used in many different configurations. A way to convey power to a moving platform (e.g. a vehicle or locomotive) is shown in FIG. 21. There a schematic drawing of a set of derived coils 200 buried in a roadway or between tracks of a railroad is shown. A receiver 201 with a spacing of the receiver coils slightly larger than the spacing in 200 is mounted on a vehicle. The non-commensurability of distances between coils in 200 and 201 ensures that—independent of the actual position of the receiver relative to the direction of the transmitter coils—there is always one coil that is well positioned and therefore optimally coupled. Sensing the induced voltage on all the receiver coils yields said alignment criterion to choose the appropriate coil.

Another, similar, approach as depicted in FIG. 21 the receiver has coils with individual lateral offset placed on the moving platform. There will always be a coil that is well positioned and therefore optimally coupled independent of the actual position of the receiver with respect to the transmission coils. As said above, sensing the induced voltage on all the receiver coils yields said alignment criterion to choose the appropriate coil.

Figure 22:
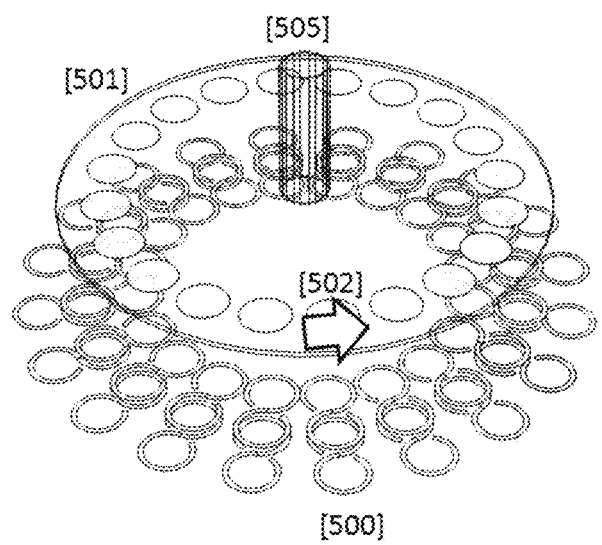
FIG. 22 is schematic drawing of a set of derived coils (210) placed to form a circle in a roadway where the power reception is done using permanent magnets.

A third approach is found in FIG. 22. Here a set of derived coils 500 are configured to form a circle in a plane. This plane can be a roadway, a parking place, or the space between tracks in a railroad. An arrangement 501 with permanent magnets is placed on a plate mounted on a vehicle. The fields excited in 500 force the permanent magnets to move and to cause a rotation 502 of the magnetic arrangement 501. Said circular motion is then mechanically transferred to a generator in order to produce electricity.

Advantages

Advantages of the proposed technology include:
More efficient coupling between coils
Reduction of stray field
The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] U.S. Pat. No. 1,119,732, Nikola Tesla, 1902
[2] U.S. Pat. No. 2,783,384, Richard L. Bright, George H Royer, 1954
[3] European patent EP0119561, Gerhard Maier, 1983
[4] US patent application US 20120286584 A1, Space-adaptive wireless power transfer system and method using evanescent field resonance, Ji Myung Kang, Korea Electrotechnology Research Institute, 2009
[5] US patent application U.S. Pat. No. 7,825,543 B2, Wireless energy transfer, Peter H. Fisher et al., 2005
[6] George Bidell Airy, Encyclopaedia Metropolitana, 1828
[7] European patent EP2417686 A1, Selectable coil array, W. David Baarman, Access Business Group International LLC, 2009
[8] Radiating and non-radiating classical current distributions and the fields they generate, A J Devaney, E Wolf, J. Phys, 1973
[9] US 20130002510 A1, Antennas with novel current distribution and radiation patterns, for enhanced antenna isolation, Snir Azulay, Matti Martiskainen, Galtronics Corporation Ltd., 2011
[10] Methods for Electromagnetic Field Analysis, Ismo V. Lindell, IEEE Press Series on Electromagnetic Wave Theory, 1996, ISBN13:978-0780360396
[11] Differential Forms in Electromagnetics, Ismo V. Lindell, IEEE Press Series on Electromagnetic Wave Theory, 2004, ISBN13: 978-0471648017
[12] European patent EP 0197580 B1, Method of producing a multipole permanent-magnetic field when manufacturing a colour display tube and device for carrying out said method, Gerardus Antonius Wilhelmus Van Veldhoven, N.V. Philips' Gloeilampenfabrieken, 1985
[13] Tiburce d'Abbadie, "Sur la différentiation des fonctions de fonctions. Nouvelles annales de mathématiques", Journal des candidats aux écoles polytechnique et normale, Sér. 1, 9 (1850), p. 119-125.
[14] Henri Cartan, "Calcul différentiel", Hermann, Paris 1967

The invention claimed is:
1. A transmitting arrangement for wireless exchange of energy with a receiving arrangement, the transmitting arrangement comprising:
a transmitting array comprising a plurality of transmitting coils, said array being connected to a current source;
a detector configured to detect said receiving arrangement; and a control arrangement connected to said current source and to each transmitting coil, the control arrangement being configured to control a current to each of said plurality of transmitting coils to generate a joint current distribution for said transmitting arrangement, in response to the detected receiving arrangement, wherein said plurality of transmitting coils is configured to generate a multipole non-radiating current distribution during inductive interaction with the detected receiving arrangement to enable a wireless exchange of energy between said transmitting arrangement and said receiving arrangement.

2. The transmitting arrangement according to claim 1, wherein said transmitting arrangement is configured to be placed adjacent to a ground surface.

3. The transmitting arrangement according to claim 2, wherein the receiving arrangement is in a vehicle, and wherein said transmitting arrangement is configured to be placed in or below a road surface to enable inductive energy transfer to the receiving arrangement in the vehicle.

4. The transmitting arrangement according claim 1, wherein said detector arrangement is configured to detect said receiving arrangement in response to an alignment criterion.

5. The transmitting arrangement according to claim 4, wherein said alignment criteria comprises said transmitting arrangement and said receiving arrangement having a pre-determined spatial orientation in relation to each other.

6. The transmitting arrangement according to claim 1, wherein said plurality of coils are arranged in a two-dimensional structure in a common plane.

7. The transmitting arrangement according to claim 1, wherein said plurality of coils are arranged in a three-dimensional structure relative to a common plane.

8. A receiving arrangement for wireless exchange of energy with the transmitting arrangement according to claim 1, comprising:

a resonator array comprising a plurality of receiving resonator coils connected to a current converter, said plurality of resonator coils being configured to interact inductively with said transmitting arrangement comprising the plurality of transmitting resonator coils, and configured to receive a generated non-radiating current distribution during inductive interaction with the transmitting arrangement to thereby enable a wireless exchange of energy with said transmitting arrangement and to provide a current to said current converter.

9. The receiving arrangement according to claim 8, wherein said plurality of receiving resonator coils are arranged in a two-dimensional structure in a common plane.

10. The receiving arrangement according to claim 8, wherein said plurality of coils are arranged in a three-dimensional structure relative to a common plane.

11. The receiving arrangement according to claim 8, wherein said receiving arrangement is configured to be placed adjacent to a bottom surface of a vehicle.

12. The receiving arrangement according to claim 8, wherein said receiving arrangement is configured to be placed adjacent to a top surface of a vehicle.

13. A vehicle comprising:
the receiving arrangement according to claim 8.

14. A system for wireless energy exchange, said system comprising:

at least one transmitting arrangement according to claim 1; and at least one receiving arrangement comprising a resonator array comprising a plurality of receiving resonator coils connected to a current converter, said plurality of resonator coils being configured to interact inductively with said transmitting arrangement comprising a plurality of transmitting resonator coils, and configured to receive a generated non-radiating current distribution during inductive interaction with the transmitting arrangement to thereby enable a wireless exchange of energy with said transmitting arrangement and to provide a current to said current converter.

15. The system according to claim 14, wherein said plurality of transmitting coils and said plurality of receiving coils are arranged in identical arrays.

16. The system according to claim 14, wherein said system is configured to enable wireless exchange of transfer when at least one transmitting arrangement and at least one receiving arrangement are aligned with each other according to a predetermined alignment criteria.

17. A method for constructing a transmitting array that enables a generation of a multipole non-radiating current distribution, the method comprising the steps of:

deciding on orders I, J of a multipole to be used, I, J being integers;

determining an arrangement of a plurality of coils to be used in the transmitting array, said arrangement comprising a number of coils and a number and orientation of the windings to be provided on each of said coils based on information that relates the number and orientation of the windings to be provided on each of said coils with the decided order I, J of the multipole; and constructing the transmitting array for the transmitting arrangement based on the determined number of coils and the determined number and orientation of the windings of each of said coils to enable the generation of the multipole non-radiating current distribution.

18. A method performed by a control arrangement that enables said control arrangement to distribute specific currents to different coils in a transmitter array in order to generate a non-radiation multipole current distribution, the method comprising the steps of:

deciding on orders I, J of a multipole to be used, I, J being integers;

determining currents to be provided to each of the coils in a plurality of coils based on information that relates the currents to be fed to each coil with the decided order I, J of the multipole;

distributing the determined currents to each of the coils in the plurality of coils in the transmitting array in order to generate the non-radiation multipole current distribution.

* * * * *